United States Patent
Cho et al.

(10) Patent No.: US 12,536,066 B2
(45) Date of Patent: Jan. 27, 2026

(54) NONVOLATILE MEMORY

(71) Applicant: SAMSUNG ELECTRONICS CO., LTD., Suwon-si (KR)

(72) Inventors: Hwasuk Cho, Suwon-si (KR); Seungwoo Yu, Suwon-si (KR); Byungkwan Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/639,856

(22) Filed: Apr. 18, 2024

(65) Prior Publication Data
US 2025/0138940 A1    May 1, 2025

(30) Foreign Application Priority Data

Oct. 31, 2023    (KR) .................... 10-2023-0147602

(51) Int. Cl.
*G06F 11/10* (2006.01)
(52) U.S. Cl.
CPC ...... *G06F 11/1016* (2013.01); *G06F 11/1064* (2013.01)
(58) Field of Classification Search
CPC ............. G06F 11/1016; G06F 11/1064; G06F 2212/1032; G06F 2212/401; G06F 12/0246; G06F 2212/7203; G11C 16/0483; G11C 7/1006; G11C 7/1078; G11C 16/10; G11C 16/26; G11C 7/1051
See application file for complete search history.

(56) References Cited

U.S. PATENT DOCUMENTS

| | | |
|---|---|---|
| 7,679,133 B2 | 3/2010 | Son et al. |
| 8,553,466 B2 | 10/2013 | Han et al. |
| 8,559,235 B2 | 10/2013 | Yoon et al. |
| 8,654,587 B2 | 2/2014 | Yoon et al. |
| 9,536,970 B2 | 1/2017 | Seol et al. |
| 10,838,623 B2 | 11/2020 | Nemazie |
| 2009/0319871 A1* | 12/2009 | Shirai ................ G06F 11/1068 711/E12.001 |

(Continued)

FOREIGN PATENT DOCUMENTS

| | | |
|---|---|---|
| JP | 2007-310760 | 11/2007 |
| JP | 2022-067002 | 5/2022 |

OTHER PUBLICATIONS

Anonymous, "Data buffer—Wikipedia", Jul. 13, 2017, pp. 1-3, XP093208521, retrieved from URL<URL:https://en.wikipedia.org/w/index.php?title-Data_buffer&oldid=790368913>.

(Continued)

*Primary Examiner* — Thien Nguyen
(74) *Attorney, Agent, or Firm* — Fish & Richardson P.C.

(57) ABSTRACT

A nonvolatile memory device includes a plurality of latch groups, an address controller, an encoder, and a buffer. The address controller controls an input address and an output address to indicate one of the plurality of latch groups. The encoder receives sector data from a latch group corresponding to the output address among the plurality of latch groups and also compresses the received sector data. The buffer stores the compressed sector data. Among the plurality of latch groups, the compressed sector data stored in the buffer is overwritten in a latch group corresponding to the input address.

20 Claims, 19 Drawing Sheets

(56) References Cited

U.S. PATENT DOCUMENTS

| | | | |
|---|---|---|---|
| 2011/0119432 A1* | 5/2011 | Yoon ................ | G11C 7/1006 |
| | | | 711/E12.001 |
| 2016/0314042 A1 | 10/2016 | Plants | |
| 2021/0200469 A1 | 7/2021 | Kim et al. | |
| 2022/0091752 A1 | 3/2022 | Singla et al. | |
| 2022/0129163 A1 | 4/2022 | Sravan et al. | |
| 2022/0164143 A1 | 5/2022 | Kim et al. | |
| 2023/0034098 A1 | 2/2023 | Tishbi | |
| 2023/0231579 A1 | 7/2023 | Cho et al. | |
| 2023/0376376 A1 | 11/2023 | Sakai et al. | |

OTHER PUBLICATIONS

Extended European Search Report in European Appln. No. 24178177.2, mailed on Oct. 15, 2024, 13 pages.

* cited by examiner

NONVOLATILE MEMORY

CROSS-REFERENCE TO RELATED APPLICATION

This application claims benefit of priority to Korean Patent Application No. 10-2023-0147602 filed on Oct. 31, 2023, in the Korean Intellectual Property Office, the disclosure of which is incorporated herein by reference in its entirety.

BACKGROUND

Generally, NAND flash memory devices are widely used as storage media in electronic products, and over time or with repeated use, the accurate reading of data can become challenging. Traditional hard decision technology discriminates the cell's voltage as either 0 or 1.

SUMMARY

To address challenges with accurately reading data, soft decision technology is being introduced. Soft decision technology analyzes the voltage more finely and estimates the probability of its corresponding value. Through such schemes, the performance of error correction codes can be enhanced, and the lifespan of NAND flash memory devices can also be extended.

Example implementations of the present disclosure relate to a nonvolatile memory device, a storage device including the same, and a method of operating the same.

An example implementation of the present disclosure is to provide a nonvolatile memory device which may compress and output data, a storage device including the same, and a method of operating the same.

According to an example implementation of the present disclosure, a nonvolatile memory device includes a plurality of latch groups; an address controller configured to control an input address and an output address to indicate one of the plurality of latch groups; an encoder configured to receive sector data from a latch group corresponding to the output address among the plurality of latch groups and to compress the received sector data; and a buffer configured to store the compressed sector data, wherein, among the plurality of latch groups, the compressed sector data stored in the buffer is overwritten in a latch group corresponding to the input address.

According to an example implementation of the present disclosure, a nonvolatile memory device includes a plurality of latches; a plurality of encoding units configured to compress data of a first size according to a predetermined compression ratio; and a plurality of registers configured to store the compressed data, wherein the plurality of latches output data as much as a first size to the plurality of encoding units during a read operation while moving a first address pointer, and wherein the plurality of latches overwrite compression data of a second size corresponding to the compression ratio from the plurality of registers while moving a second address pointer during an input operation.

According to another example implementation of the present disclosure, a method of operating a nonvolatile memory device includes outputting soft decision data from cache latches under first address control; compressing the soft decision data according to a predetermined compression ratio; and overwriting the compressed data in a portion of the cache latches under a second address control, wherein the first address control and the second address control are separated from each other.

According to another example implementation of the present disclosure, a storage device includes at least one nonvolatile memory device including a compression circuit configured to compress soft decision data; and a controller including a decompression circuit configured to receive compressed soft decision data from the at least one nonvolatile memory device and to decompress the received soft decision data, wherein the compression circuit includes a plurality of latches configured to store the soft decision data; an encoder configured to read data of a first size from among the plurality of latches in response to an output address and to compress the read data; an encoding buffer configured to store the read data and to overwrite the stored data in corresponding latches among the plurality of latches in response to an input address; a first address controller configured to perform a first address control over the output address for the plurality of latches during an output operation; and a second address controller configured to perform a second address control over the input address for the plurality of latches during an input operation.

According to an example implementation of the present disclosure, a method of operating a nonvolatile memory device includes receiving a special command from an external device; reading first data according to a hard decision method and reading second data according to a soft decision method in response to the special command; compressing the second data; and outputting the first data and the compressed second data to the external device, wherein the compressing the second data includes storing the second data in cache latches; outputting data of a sector unit in response to an output address from the cache latches; compressing the output data of a sector unit; and overwriting the compressed data to a portion of the cache latches in response to an input address.

BRIEF DESCRIPTION OF THE DRAWINGS

The above and other aspects, features, and advantages of the present disclosure will be more clearly understood from the following detailed description, taken in combination with the accompanying drawings, in which.

DETAILED DESCRIPTION

Hereinafter, implementations of the present disclosure will be described as below with reference to the accompanying drawings.

A nonvolatile memory device, a storage device including the same, and a method of operating the same may operate two address pointers in one operation using two separated address controls to access a C-latch (cache-latch) in a page buffer. The nonvolatile memory device in an example may include an address controller used when reading data to be encoded (or compressed), an address controller used when writing encoded data, an encoder (or compression circuit) for encoding data in a C-latch, and a register for storing encoded data. The nonvolatile memory device in an example may enable sequential repetition of a read operation and a write operation for encoded data by distinguishing between an address controller used when reading data to be encoded and an address controller used when writing encoded data. Accordingly, the example nonvolatile memory device may significantly reduce the capacity of the register for storing encoded data.

The example nonvolatile memory device may operate two separate address controllers, such that sequential repetition of a read operation and a write operation may be enabled. The example nonvolatile memory device may enable sequential repetition of a read operation and a write operation for data when compressing data in a C-latch. The size of the register which temporarily stores encoded data before overwriting the data to the C-latch may be greatly reduced. Accordingly, a compressing operation on data may be implemented on-chip.

Figure 1:
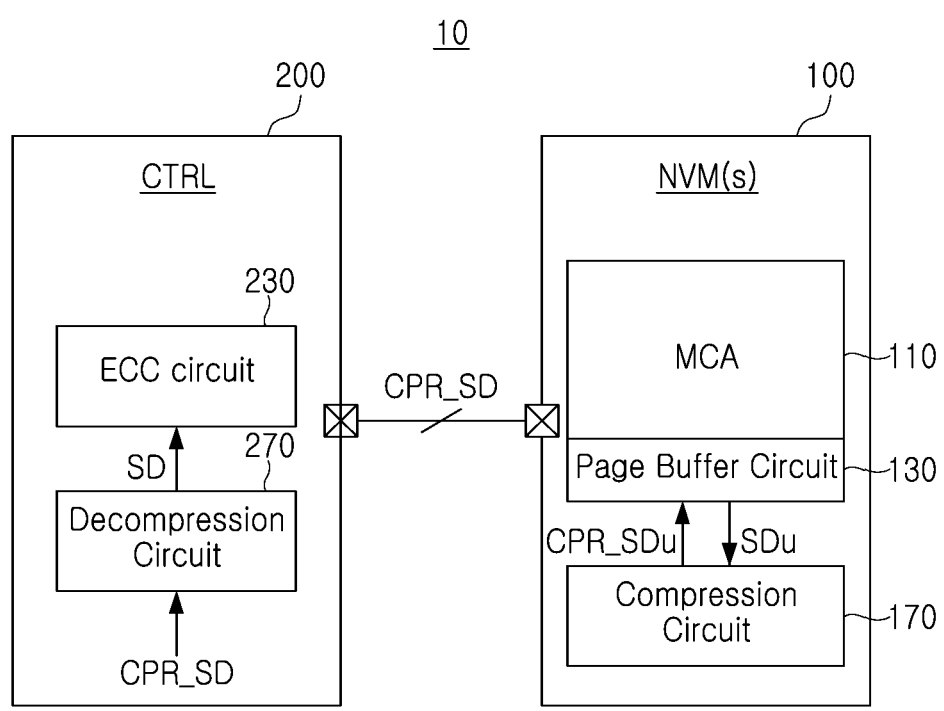
FIG. 1 is a diagram illustrating a diagram illustrating an example storage device.

FIG. 1 illustrates an example storage device 10. Referring to FIG. 1, the storage device 10 may include at least one nonvolatile memory device 100 (NVM(s)) and a controller 200 CTRL. The nonvolatile memory device 100 and the controller 200 may be connected to each other through at least one channel.

At least one nonvolatile memory device 100 may be implemented as a chip or die. The nonvolatile memory device 100 may include a memory cell array 110 (MCA), a page buffer circuit 130, and a compression circuit 170.

The memory cell array 100 may include memory cells disposed in a region in which a plurality of wordlines and a plurality of bitlines are connected to each other. Here, each of the memory cells may include a nonvolatile memory cell. The page buffer circuit 130 may be implemented to program write data into memory cells connected to the plurality of bitlines, respectively, or to read data from memory cells. The page buffer circuit 130 may include a plurality of page buffers connected to the bitlines, respectively.

The compression circuit 170 may be implemented to read data (e.g., soft decision data of a sector unit SDu) stored in the page buffer circuit 130 through a first address control corresponding to the output operation. In an example implementation, the compression circuit 170 may read the soft decision data of a sector unit SDu from latches in the page buffer circuit 130 under a first address control.

Also, the compression circuit 170 may be implemented to compress the read data SDu based on a compression algorithm. In an example implementation, the compression circuit 170 may compress data SDu of a sector unit into data CPR_SDu of a size smaller than a sector size according to a compression ratio. In an example implementation, soft decision data of a sector unit SDu may represent an overlap area between adjacent threshold voltage distributions as "1" and other areas as "0." In the overlap area between threshold voltage distributions, reliability of hard decision data may be relatively low. In the other areas, reliability of hard decision data may be relatively high. Since the overlap area between adjacent threshold voltage distributions is narrower than the other areas, the number of "1" in soft decision data may be less than the number of "0." The compression circuit 170 may generate compression data CPR_SDu by encoding "1" as a "1" position in the soft decision data of a sector unit SDu.

Also, the compression circuit 170 may be implemented to write compressed data CPR_SDu to the page buffer circuit 130 through a second address control corresponding to an input operation. In an example implementation, the compression circuit 170 may overwrite compressed soft decision data CPR_SDu to a portion of latches in the page buffer circuit 130 under the second address control. Here, the first address control and the second address control may operate independently by different data path circuits. In an example implementation, the first address control and the second address control may be the same. In another example implementation, the first address control and the second address control may be different.

Also, the compression circuit 170 may distinguish between an address controller for reading data SDu to be compressed during an output operation and an address controller for writing compressed data CPR_SDu during an input operation, thereby enabling sequential repetition of an input operation and an output operation for the soft decision data SD to the sector unit SDu. In an example implementation, the address pointer corresponding to the output operation and the address pointer corresponding to the input operation may be separated from each other.

Also, the nonvolatile memory device 100 may read compressed soft decision data CPR_SD to the controller 200 through a channel. By transmitting the compressed soft decision data CPR_SD to a channel, performance of soft decision operation may be improved.

The controller 200 may be connected to at least one nonvolatile memory device 100 through at least one channel. The controller 200 may be implemented to control overall operations of the nonvolatile memory device 100. For example, the controller 200 may transmit commands, addresses, and data to the nonvolatile memory device 100 or may receive data from the nonvolatile memory device 100 through a channel.

The controller 200 may include an error correction circuit 230 (ECC) and a decompression circuit 270. The error correction circuit 230 may be implemented to perform an error correction operation on read data. Here, the error correction operation may apply either a hard decision method or a soft decision method. Here, the hard decision method may be a technique of correcting errors in data using read data and an error correction code according to turning on/off characteristics of the memory cell when a reference voltage is applied. Also, the soft decision method may be a technique of correcting data errors by additionally using additional information about reliability of the hard decision data (e.g., soft decision data SD), separately from the hard decision data and error correction codes.

The decompression circuit 270 may be implemented to recover soft decision data SD by decompressing compressed data CPR_SD based on a decompression algorithm. The decompression circuit 270 may read the recovered soft decision data SD into the error correction circuit 230. The error correction circuit 230 may correct errors in hard decision data based on hard decision data and soft decision data. For example, the error correction circuit 230 may correct hard decision data by changing the log likelihood ratio (LLR) based on soft decision data.

The storage device 10 according to an example implementation may include a nonvolatile memory device 100 for compressing soft decision data according to column address control of independent data path circuits and a controller for decompressing compressed soft decision data CPR_SD, thereby improving overall performance of soft decision operation and reducing a chip size.

Figure 2:
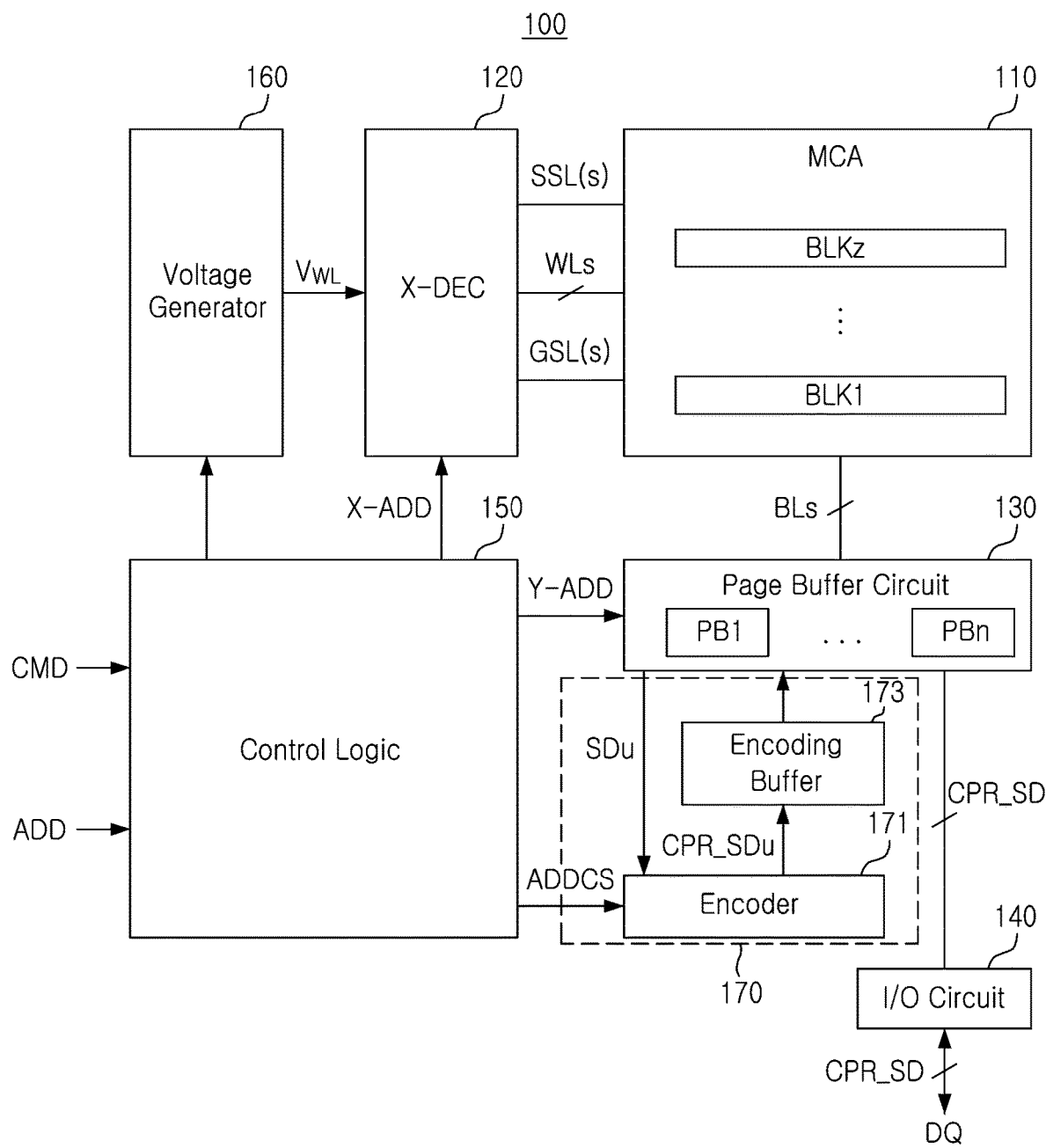
FIG. 2 is a diagram illustrating a diagram illustrating an example nonvolatile memory device.

FIG. 2 illustrates an example nonvolatile memory device 100. Referring to FIG. 2, the nonvolatile memory device 100 may include a memory cell array 110 (MCA), a row decoder 120 (X-DEC), a page buffer circuit 130, an input/output circuit 140, a control logic 150, a voltage generator 160, and a compression circuit 170.

The memory cell array 110 (MCA) may be connected to the row decoder 120 (X-DEC) through wordlines WLs or select lines SSL(s) and GSL(s). The memory cell array 110 may be connected to the page buffer circuit 130 through bitlines BLs. The memory cell array 110 may include a plurality of cell strings. Each channel of cell strings may be formed vertically or horizontally. Each of the cell strings may include a plurality of memory cells. Here, the plurality of memory cells may be programmed, erased, or read by voltages provided by the bitline BLs or the wordline WLs. Generally, a program operation may be performed in a page unit, and an erase operation may be performed in a block unit. The memory cell is described in greater detail in U.S. registered patents U.S. Pat. No. 7,679,133, 8,553,466, 8,654,587, 8,559,235, and 9,536,970.

The row decoder 120 (X-DEC) may be implemented to select one of the memory blocks BLK1 to BLKz (z is an integer of 2 or more) of the memory cell array 110 in response to a row address X-ADD among address ADD. The row decoder 120 may select one of wordlines of the selected memory block in response to the address X-ADD. The row decoder 120 may transmit a wordline voltage VWL corresponding to an operation mode of a wordline of the selected memory block. During a program operation, the row decoder 120 may apply a program voltage and a verification voltage to a selected wordline and a pass voltage to an unselected wordline. During a read operation, the row decoder 120 may apply a read voltage to a selected wordline and a read pass voltage to an unselected wordline.

The page buffer circuit 130 may be implemented to operate as a write driver or a sense amplifier. During a program operation, the page buffer circuit 130 may apply a bitline voltage corresponding to data to be programmed to the bitlines BLs of the memory cell array 110. During a read operation or a verification read operation, the page buffer circuit 130 may sense data stored in a selected memory cell through a corresponding bitline. Each of the plurality of page buffers PB1 to PBn (n is an integer of 2 or more) included in the page buffer circuit 130 may be connected to at least one bitline in response to a column address Y-ADD among the addresses ADD. In an example, each of the plurality of page buffers PB1 to PBn may be implemented such that a sense node and a transfer node are separated from each other.

The input/output circuit 140 may provide data provided from an external entity to the page buffer circuit 130. The input/output circuit 140 may provide a command CMD provided by an external entity to the control logic 150. The input/output circuit 140 may provide the address ADD provided by an external entity to the control logic 150. Also, the input/output circuit 140 may externally read data sensed and latched by the page buffer circuit 130. Also, the input/output circuit 140 may externally read compression data CPR_SD stored in the encoding buffer 173.

The control logic 150 may be implemented to control the row decoder 120, the page buffer circuit 130, the input/output circuit 140, the voltage generator 160, and the compression circuit 170 in response to a command CMD or a control signal transmitted from an external device. Also, the control logic 150 may be implemented to perform a cell count-based dynamic read operation. Also, the control logic 150 may transmit an address control signal ADDCS to the compression circuit 170 in a data compression operation. In an example, the address control signal ADDCS may include a first address control signal for reading soft decision data of a sector unit SDu from the page buffers PB1 to PBn and a second address control signal for writing compressed data CPR SDu to the encoding buffer 173.

The voltage generator 160 may be implemented to generate various types of wordline voltages to be applied to each wordline under control of the control logic 150 and a well voltage to be supplied to the bulk (e.g., well region) in which memory cells are formed. Wordline voltages applied to the wordlines WLs may include a program voltage, a pass voltage, a read voltage, read pass voltages, or the like. Although not illustrated, the nonvolatile memory device 100 in an example may include a cell counter. The cell counter may be implemented to count memory cells corresponding to a specific threshold voltage range from data sensed by the page buffer circuit 130. For example, the cell counter may count the number of memory cells having a threshold voltage in a specific threshold voltage range by processing data sensed by each of the plurality of page buffers PB1 to PBn.

The compression circuit 170 may include an encoder 171 and an encoding buffer 173. The compression circuit 170 may read the soft decision data of a sector unit SDu from the page buffers PB1 to PBn in response to an address control signal ADDCS, may compress the read soft decision data SDu in the encoder 171 according to a compression algorithm, and may write the compressed data CPR_SDu to the encoding buffer 173. Meanwhile, the encoding buffer 173 illustrated in FIG. 2 is illustrated externally of the page buffer circuit 130, but an implementation thereof is not limited thereto. The encoding buffer in an implementation may be present in the page buffer circuit 130.

Figure 3A:
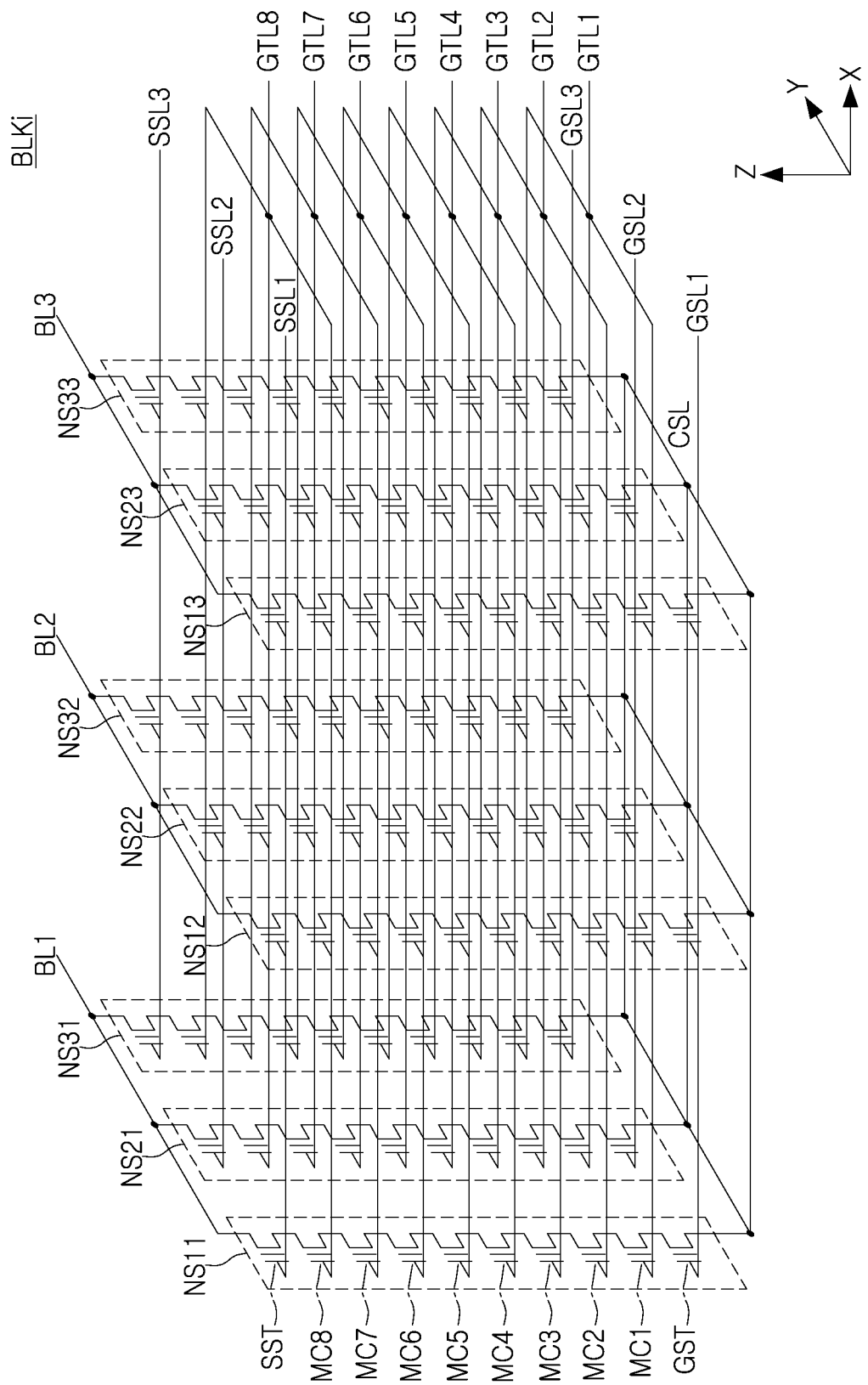
FIG. 3A is a circuit diagram illustrating an example memory block.

FIG. 3A is a diagram illustrating an example circuit diagram of a memory block BLKi (i is an integer of 2 or more). A plurality of NAND strings included in the memory block BLKi may be formed in a vertical direction with the substrate. Referring to FIG. 3A, the memory block BLKi may include a plurality of NAND strings NS11 to NS33 connected between bitlines BL1, BL2, and BL3 and a common source line CSL. Each of the plurality of NAND strings NS11 to NS33 may include a string select transistor SST, a plurality of memory cells MC1, MC2, . . . , MC8 and a ground select transistor GST. In FIG. 3A, each of the plurality of NAND strings NS11 to NS33 may include eight memory cells MC1, MC2, . . . , MC8. However, the number of memory cells is not limited thereto.

The string select transistor SST may be connected to corresponding string select lines SSL1, SSL2, and SSL3. The plurality of memory cells MC1, MC2, . . . , MC8 may be connected to the corresponding gate lines GTL1, GTL2, . . . , GTL8, respectively. The gate lines GTL1, GTL2, . . . , GTL8 may correspond to wordlines, and a portion of gate lines GTL1, GTL2, . . . , GTL8 may correspond to dummy wordlines. The ground select transistor GST may be connected to corresponding ground select lines GSL1, GSL2, and GSL3. The string select transistor SST may be connected to corresponding bitlines BL1, BL2, and BL3, and the ground select transistor GST may be connected to the common source line CSL. Wordlines (e.g., WL1) on the same level may be commonly connected, and the ground select lines GSL1, GSL2, GSL3 and the string select lines SSL1, SSL2, and SSL3 may be separated from each other, respectively. Meanwhile, the memory block BLKi illustrated in FIG. 3A may be connected to eight gate lines GTL1, GTL2, . . . , GTL8 and three bitlines BL1, BL2, BL3 but is not limited thereto.

Figure 3B:
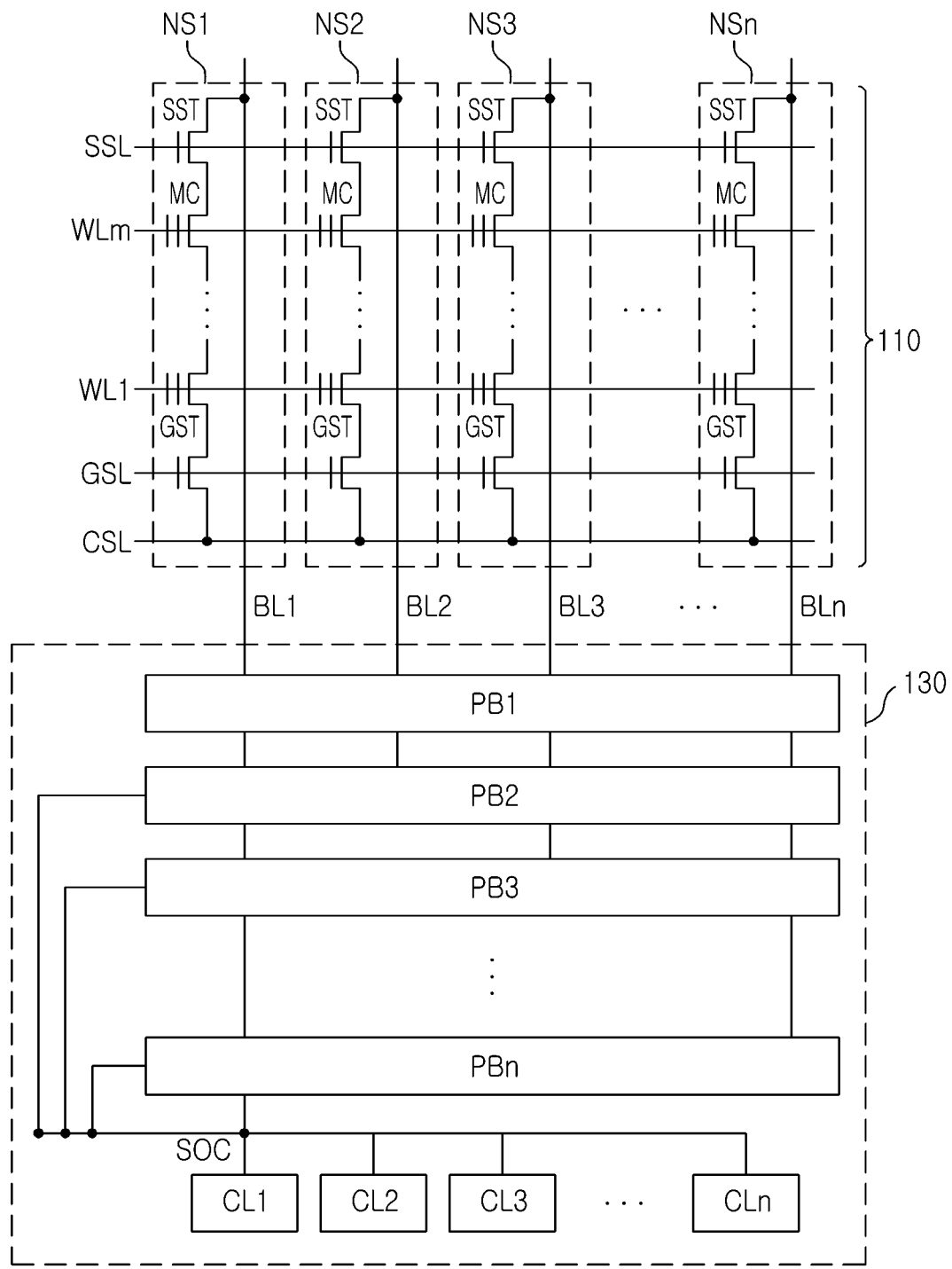
FIG. 3B is a diagram illustrating a connection relationship between a memory cell array and a page buffer circuit.

FIG. 3B is a diagram illustrating the connection relationship between a memory cell array 110 and a page buffer circuit 130 according to an implementation. Referring to FIG. 3B, the memory cell array 110 may include first to nth NAND strings NS1 to NSn (n is an integer of 2 or more). Each of the first to nth NAND strings NS1 to NSn may include a ground select transistor GST connected to a ground select line GSL, a plurality of memory cells MC each connected to a plurality of wordlines WL1 to WLm (m is an integer greater than or equal to 2), and a string select transistor SST connected to a string select line SSL, and the ground select transistor GST, the plurality of memory cells MC and the string select transistor SST may be connected to each other in series.

The page buffer circuit 130 may include first to nth page buffers PB1 to PBn. The first page buffer PB1 may be connected to a first NAND string NS1 through a first bitline BL1, and a nth page buffer PBn may be connected to a nth NAND string NSn through a nth bitline BLn. For example, n may be 7, and the page buffer circuit 130 may have a structure in which eight page buffers PB1 to PBn are disposed in a row. For example, the first to nth page buffers PB1 to PBn may be disposed in a row in an extension direction of the first to nth bitlines BL1 to BLn.

The page buffer circuit 130 may further include first to nth cache latches CL1 to CLn, respectively, corresponding to the first to nth page buffers PB1 to PBn. The page buffer circuit 130 may have a structure in which eight cache latches CL1 to CLn are disposed in a row. For example, the first to nth cache latches CL1 to CLn may be disposed in a row in the extension direction of the first to nth bitlines BL1 to BLn. Sense nodes of each of the first to nth page buffers PB1 to PBn may be commonly connected to the combined sense node SOC. Also, the first to nth cache latches CL1 to CLn may be commonly connected to the combined sense node SOC. Accordingly, the first to nth page buffers PB1 to PBn may be connected to the first to nth cache latches CL1 to CLn through a combined sense node SOC.

Figure 4A:
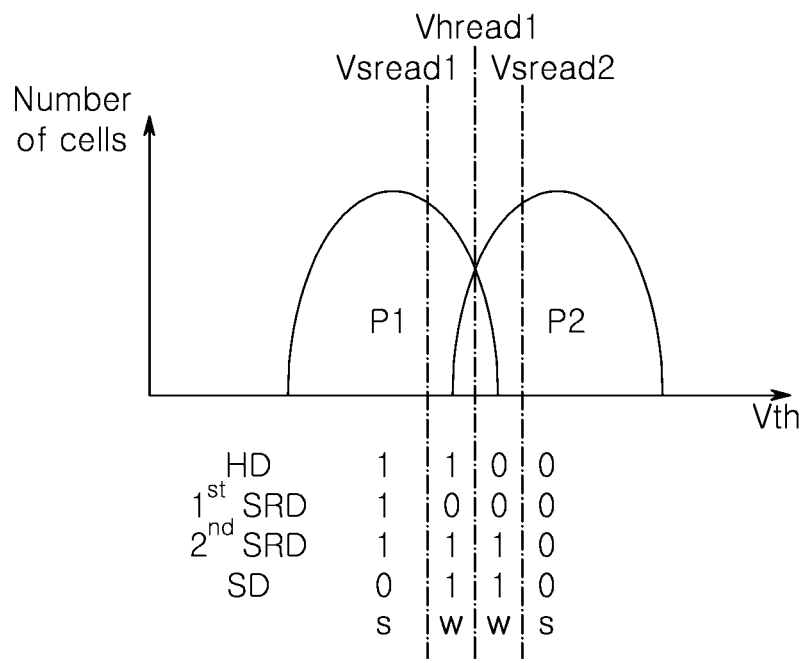
FIGS. 4A and 4B are diagrams illustrating necessity of a read operation and a compressing operation of soft decision.
Figure 4B:
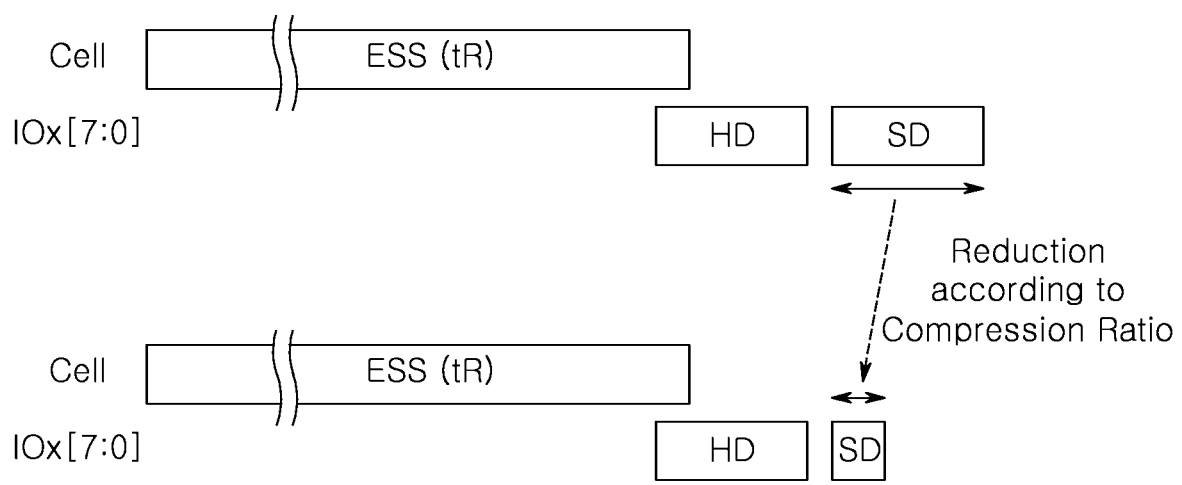

FIGS. 4A and 4B are diagrams illustrating the necessity of a read operation and a compressing operation of a soft decision. As illustrated in FIG. 4A, soft decision read voltages used in a soft decision read operation may be Vsread1 and Vsread2. The soft decision read operation may indicate that a number of soft decision read voltages Vsread1 and Vsread2 having a predetermined voltage difference may be applied to a memory cell based on the hard decision read voltage Vhread1 and information adding reliability to hard decision data HD may be formed. When the soft decision read voltage Vsread1 is applied to the memory cell, determined $dat^a$ 1st SRD may be 1, 0, 0, and 0 depending on the turning on or off of the memory cell. When the soft decision read voltage Vsread2 is applied to the memory cell, $dat^a$ 2nd SRD determined according to the turning on or off of the memory cell may be 1, 1, 1, and 0.

By performing exclusive OR (XOR) computation on the read $value^s$ 1st SRD $an^d$ 2nd SRD obtained by two read operations, soft decision data SD may be formed. As illustrated, the soft decision data SD may be 0, 1, 1 and 0. XOR computation may be performed in the page buffer circuit 130. That is, XOR computation may be performed on the read $value^s$ 1st SRD $an^d$ 2nd SRD obtained by two read operations using the plurality of latches in the page buffer circuit 130. The soft decision data SD may indicate reliability for hard decision data HD. When the soft decision data SD is 0, it may indicate a state in which reliability of the hard decision data is high, that is, strong(s). When the soft decision data SD is 1, it may indicate a state in which reliability of the hard decision data is low, that is, weak (w). In other words, 10, 11, 01, 00, which are combinations of hard decision data HD 1, 1, 0, 0 and soft decision data SD 0, 1, 1, 0, may indicate hard decision data HD 1 having high reliability, hard decision data HD 1 having low reliability, hard decision data HD 0 having low reliability, and hard decision data HD 0 having high reliability.

Generally, the soft decision data SD may have a relatively low ratio of 1 (e.g., about 2%). Accordingly, as illustrated in FIG. 4B, when the soft decision data SD is compressed according to a soft decision read operation (ESS(tR)), a data length read through the input/output pad (IOx[7:0]) may decrease. The data length may be reduced depending on a compression ratio.

Figure 5:
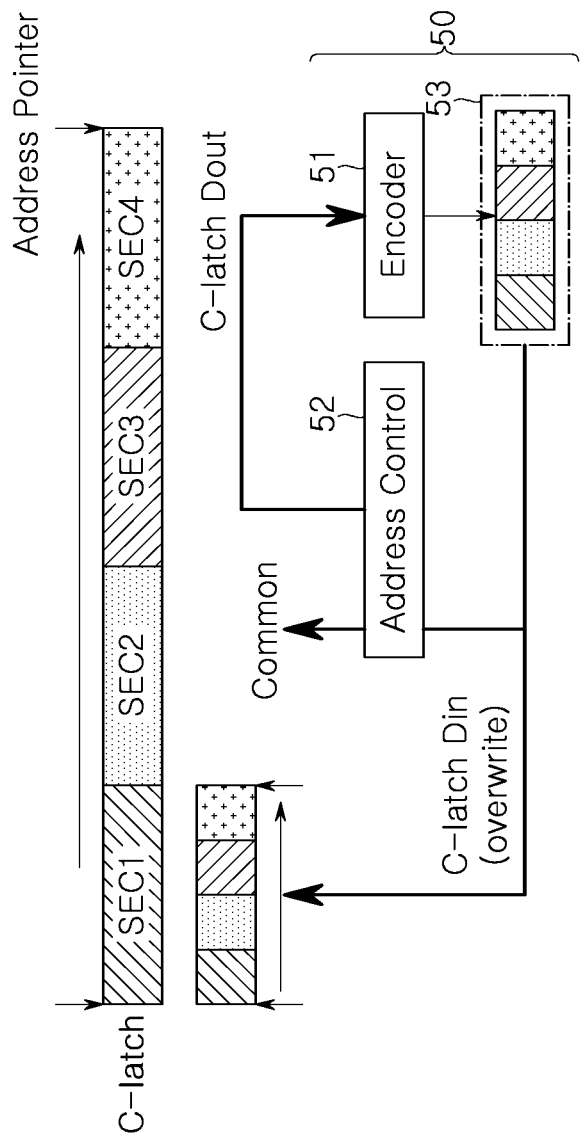
FIG. 5 is a diagram illustrating an example compression process of a general nonvolatile memory device.

FIG. 5 is a diagram illustrating a compression process of a general nonvolatile memory device. Referring to FIG. 5, according to a read operation of soft decision, sector data SEC1, SEC2, SEC3, and SEC4 may be stored in C-latches corresponding to the number of page buffers PB1 to PBn. In an implementation, when the size of page data is 16 kilobytes (KB), each size of sector data SEC1, SEC2, SEC3, and SEC4 may be 4 KB. However, the size of page data and the number of sector data are not limited thereto.

Generally, the C-latch operation may support an output (read) operation Dout and an input (write) operation Din only once. For this reason, an address controller 52 may be shared in the output operation Dout and the input operation Din. When encoding the data of the entirety of C-latches (e.g., 16 KB) using an address controller 52, after the entire data output operation Dout is performed, a compressing operation may be performed in the encoder 51, and thereafter, the encoded data input operation Din (overwrite) may be performed. In this case, at least an encoding buffer 53 having a size corresponding to (16 KB data)*(compression ratio) may be required. Generally, data may be stored in C-latches to read compressed data out of a chip. To complete compression in one cycle (one page), storage space equal to the compression ratio of C-latches may be required. Chip-size overhead may be incurred in implementing a compression circuit.

The nonvolatile memory device 100 according to an implementation may reduce the size of a separate storage space, that is, the encoding buffer, by independently operating address control of the output operation Dout and the input operation Din in the C-latch operation.

Figure 6:
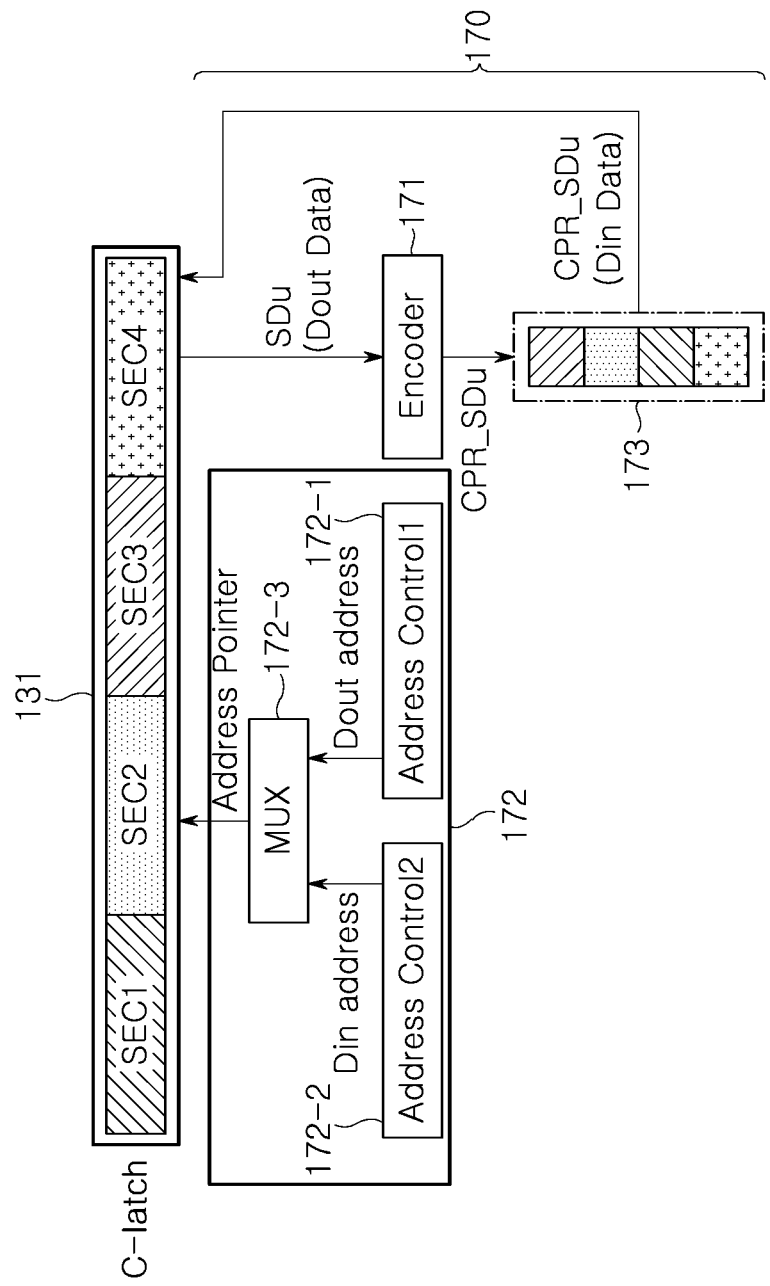
FIG. 6 is a diagram illustrating an example compression circuit of a nonvolatile memory device.

FIG. 6 is a diagram illustrating a compression circuit 170 of a nonvolatile memory device 100 according to an example implementation. Referring to FIG. 6, the compression circuit 170 may include an encoder 171, an address controller 172, and an encoding buffer 173.

The C-latches 131 may be divided into a plurality of sectors having latch groups. The C-latches 131 may read data SDu (Dout Data) from the sector corresponding to the address pointer read from the address controller 172 in an output operation Dout. Also, the C-latches 131 may receive compressed data CPr_SDu (Din Data) from the encoding buffer 173 in a sector corresponding to an address pointer read from the address controller 172 in an input operation Din.

The encoder 171 may receive sector data SDu from the C-latches 131 under a first address control, may compress the data based on a compression algorithm, and may read the compressed data CPR_SDu to the encoding buffer 173.

The address controller 172 may include a first address controller 172-1, a second address controller 172-1, and a multiplexer 172-3. The first address controller 172-1 may read an output address (Dout address) corresponding to a read operation for the C-latches 131 under a first address control. The second address controller 172-1 may read an input address (Din address) corresponding to the write operation on the C-latches 131 under a second address control. In an example implementation, the first address controller 172-1 and the second address controller 172-2 may operate independently of each other. The multiplexer 172-3 may read one of the output address (Dout address) or the input address (Din address) as an address pointer in the output operation Dout/input operation Din.

Meanwhile, in FIG. 6, the address controller 172 may separate address control through the multiplexer 171-3. However, an embodiment thereof is not limited thereto. The address controller in an implementation may control page buffers directly by the first address controller and the second address controller without a multiplexer.

Meanwhile, in FIG. 6, the address controller 172 is illustrated as an internal component of the compression circuit 170, but an implementation thereof is not limited thereto. The address controller in an example embodiment may be implemented as a component of the control logic 150 illustrated in FIG. 2.

The encoding buffer 173 may be implemented to store compressed data CPR_SDu from the encoder 171 and to overwrite the stored data CPR_SDu to a portion of the C-latches 131 under the second address control. In an example, the encoding buffer 173 may be implemented as a register.

Compared to the example illustrated in FIG. 5, the compression circuit 170 in an example may reduce the size of the encoding buffer 173 by an amount corresponding to a compression ratio when encoding by sequentially repeating read/write operations. For example, as illustrated in FIG. 6, when page data is divided into four pieces of sector data SEC1 to SEC4 and the compression ratio is 25%, a minimum size of the encoding buffer 173 may be a sector data size times a compression ratio.

Meanwhile, when reading compression data CPR_SD out of a chip in the nonvolatile memory device 100 in an example, which address mapping should be supported may vary depending on requirements from a user.

Figure 7:
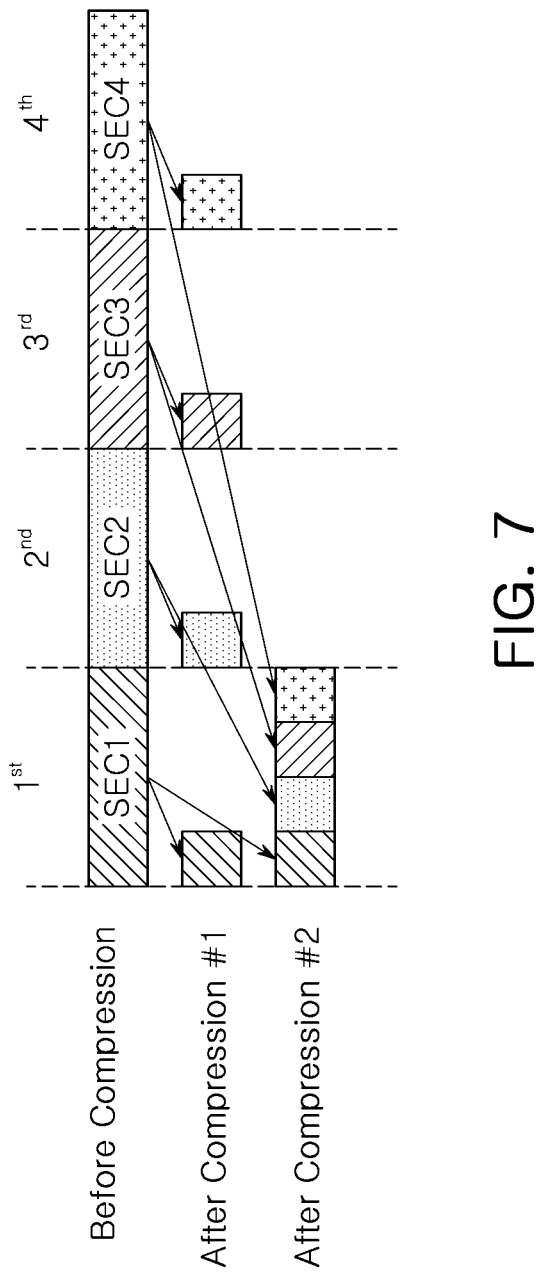
FIG. 7 is a diagram illustrating example external output methods for compression of data in a nonvolatile memory device.

FIG. 7 is a diagram illustrating external output methods for compression data (CPR_SD) in a nonvolatile memory device 100 according to an example. In a first case, a start column address for each sector before and after compression may be the same. In an example, data length may vary. Here, the data length may be fixed in hardware. In the second case, the start column address for each sector before and after compression may be different. In this case, the first sector data may include the entire compression data CPR_SD. An output operation for the first sector data may become the entire compression data output operation.

Figure 8:
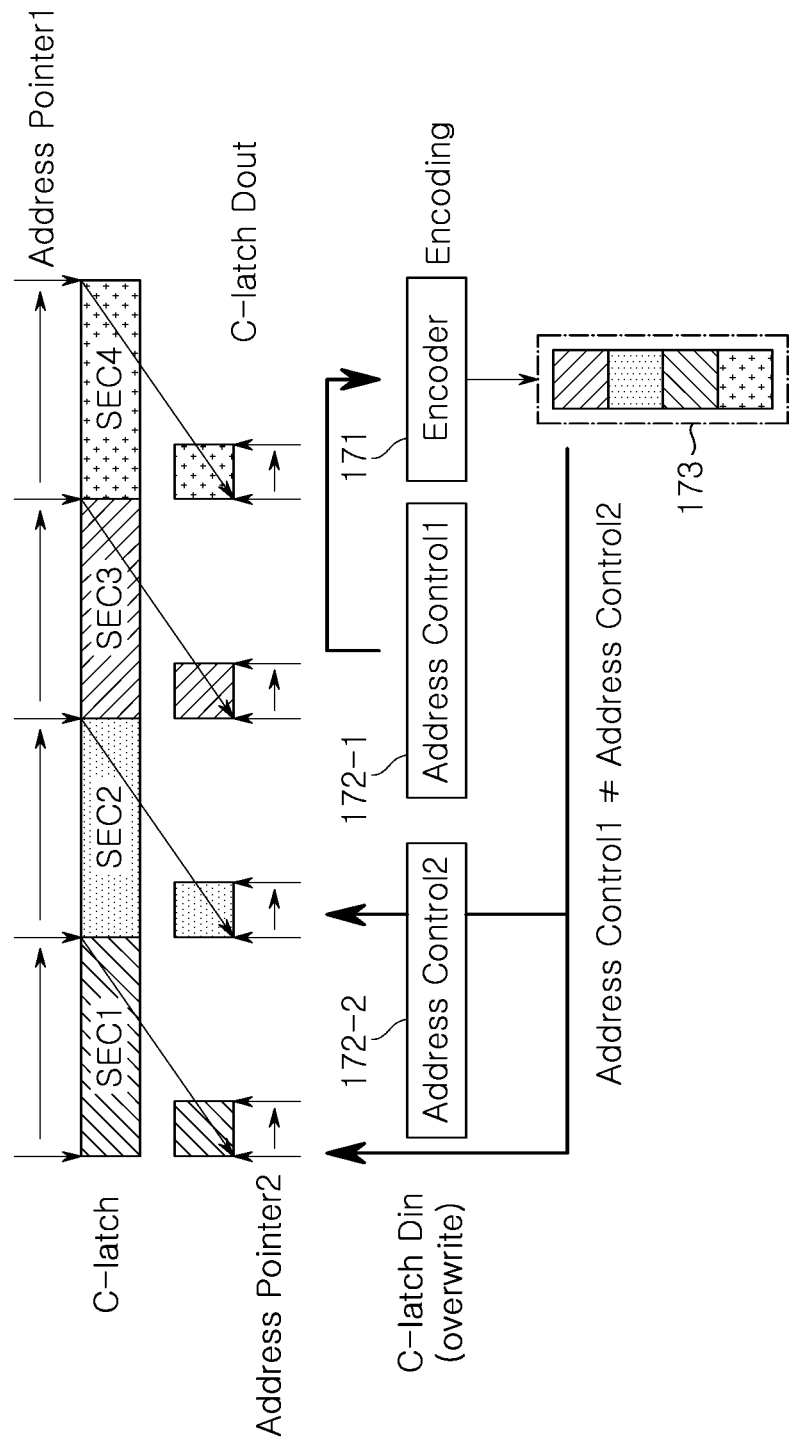
FIG. 8 is a diagram illustrating example address control of compression data of a nonvolatile memory device.

FIG. 8 is a diagram illustrating address control of compression data of a nonvolatile memory device 100 according to an example. Referring to FIG. 8, the first address control and the second address control may be different. C-latch data of the first sector may be output (Dout). In this case, the first address control may include moving a first address pointer from a start point of a first sector to a last point of the first sector. Sector data SEC1 may be compressed using a compression/encoding window by an encoder 171. When the first sector data SEC1 is compressed, the output operation Dout and the compressing operation may be stopped. Thereafter, the compressed data may be stored in a separate storage space, that is, the encoding buffer 173. Thereafter, the data accumulated in the encoding buffer 173 may be overwritten to the C-latch of the corresponding sector. In other words, data in a separate storage space may be reused. In this case, the second address control may include moving a second address pointer from a start point of the first sector to a point at which a predetermined amount (e.g., 1 KB) is added to the first sector.

The above-described processes may be performed repeatedly for the entirety of sectors. In this case, the separated address pointers may retrieve the previous last point and may repeat the process described above from the address separation. That is, the first address pointer may move from a start point of a second sector to a last point of the second sector (second 4 KB Dout). The second address pointer may move from a start point of the second sector to a point at which a predetermined amount is added to the second sector (second compression data overwrite).

In FIG. 8 the first address control may be different from the second address control. The address control is not limited thereto, and the first address control and the second address control may be the same.

Figure 9:
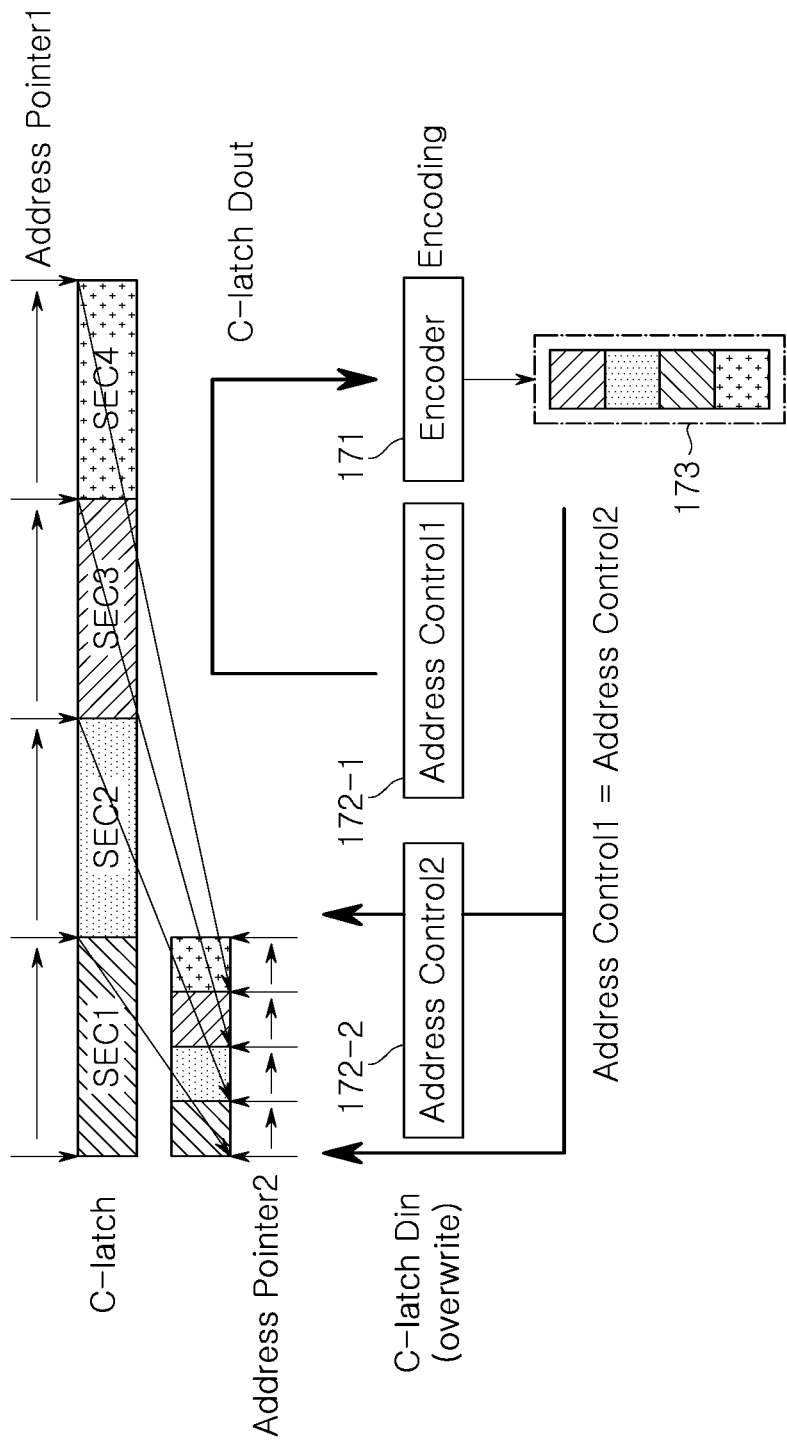
FIG. 9 is a diagram illustrating example address control of compression data of a nonvolatile memory device.

FIG. 9 is a diagram illustrating address control of compression data of a nonvolatile memory device 100 according to an example. Referring to FIG. 9, the first address control and the second address control may be the same.

In the first sequence, C-latch data SEC1 of a first sector may be output (read) according to a first address controller 172-1. A first address pointer (Address pointer 1) may read data while moving from a start point of a first sector to a last point of the first sector.

In the second sequence, data output from the first sequence may be encoded in the encoder 171. For example, the encoder 171 may perform encoding operations by 16 B window.

In the third sequence, the data (compression data) encoded by the encoder 171 may be stored in a separate storage space, that is, the encoding buffer 173.

In the fourth sequence, when the read operation and the encoding operation for first sector data SEC1 are completed, the read operation may be stopped, and the encoding data stored in the encoding buffer 173 may be overwritten in C-latch. In this case, it may not be necessary to store the data in a separate storage space. Accordingly, the encoding buffer 173 may be reused when performing outputting/encoding of subsequent sectors.

In an example, a second address pointer (Address Pointer 2) may need to access the address for overwriting. Accordingly, while moving from a start point of the first sector to a predetermined point (e.g., 1st 4 KB+1 KB), the first address pointer (Address Pointer 1) may maintain a last point of the first sector.

In the subsequent sequence, the above-described first sequence to fourth sequence may be repeated in sequence in subsequent sectors. This repetition process may be performed in sequence for second sector data SEC2, third sector data SEC3, and fourth sector data SEC4. In this case, separated address pointers (address control pointers 1 and 2) may retrieve the previous last point and may repeat the above process starting from the address. That is, the first address pointer (address pointer 1) may move from the start point of the second sector to the end of the second sector (second sector read operation). The second address pointer (address pointer 2) may move from first sector+predetermined amount (e.g., 1 KB) to first sector+1 times the predetermined amount (e.g., 2 KB) point (second sector encoding data overwrite operation).

Figure 10:
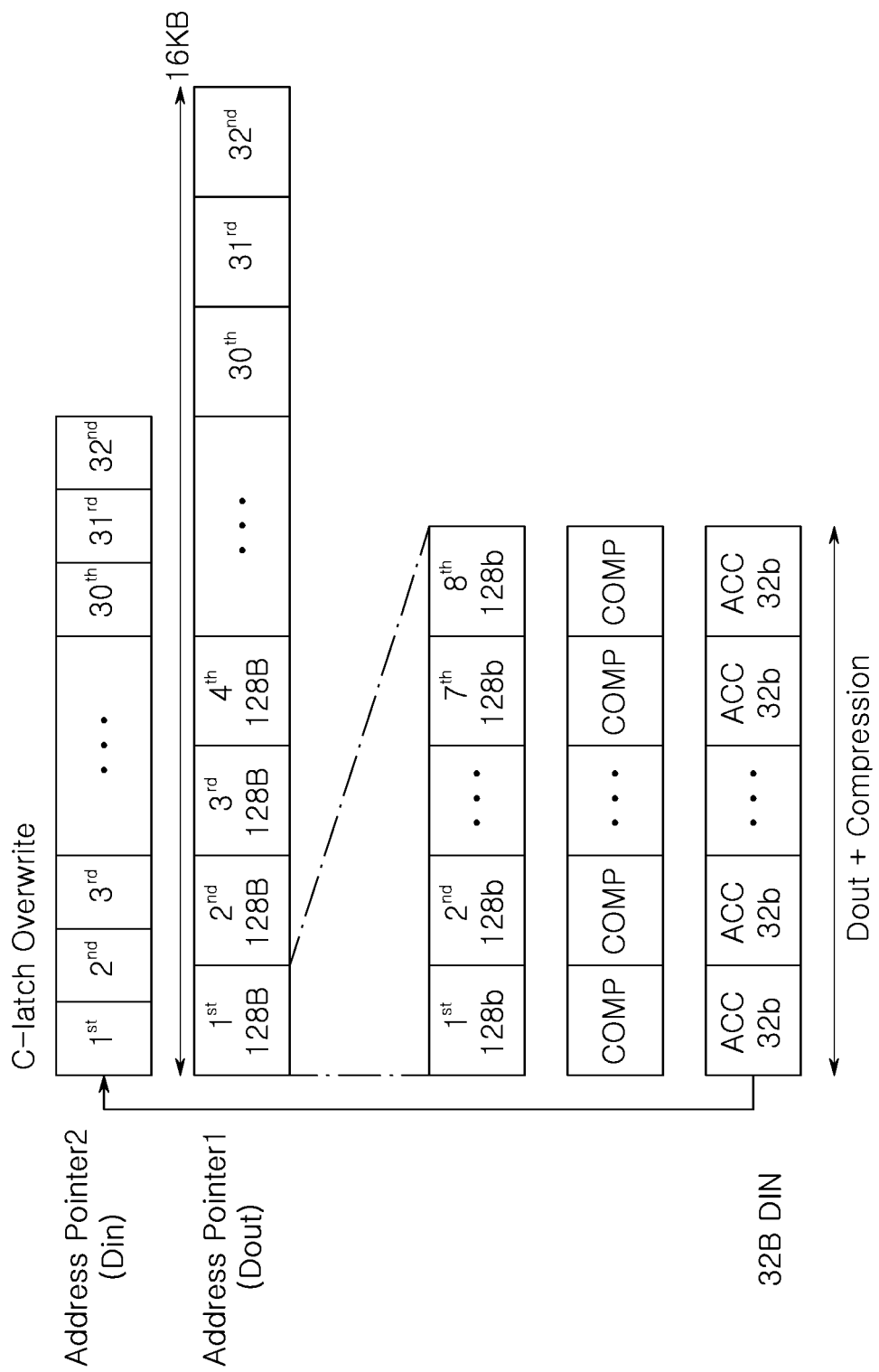
FIG. 10 is a diagram illustrating independent operations of a first address control for a read address for a C-latch and a second address control for a write address for a C-latch in a nonvolatile memory device.

FIG. 10 is a diagram illustrating independent operations of a first address control for a read address for a C-latch and a second address control for a write address for a C-latch in a nonvolatile memory device 100 according to an implementation. A read operation may be an M-byte output operation M-byte Dout, and a write operation may be an N-byte input operation N-byte Din. In FIG. 10, for ease of description, a 128-byte output operation 128-byte Dout and a 32-byte input operation 32-byte Din are illustrated.

The size of the page may be 16 KB (Kilo Byte), and the size of each sector may be 128 B. Accordingly, a total of 32 sectors may be present in the C-latch. As a first address pointer moves from a start point of each sector to a last point, the output operation Dout may be performed. Each sector may be divided into eight pieces of 128b, and a compression operation may be performed on the divided pieces of 128b from the corresponding compression unit comp. Accordingly, 32b of compressed data may be stored in the corresponding storage space ACC. Eight pieces of 32 B compression data, that is, 32 B compression data, may be overwritten in the C-latch instructed by the second address pointer (Din).

The compression time and the required active area may be in a trade-off relationship. By dividing the address controller into two controllers, when changing the clock generation circuit, the size of the unit compression/output sector may be adjusted to suit the target. For example, a TLC (Triple Level Cell) product may be implemented as 128 B Dout & 32 B Din, and a QLC (Quad Level Cell) product may be implemented as 64 B Dout & 16 B Din. QLC products may have a longer read time (tR) than that of TLC products, such that the compression time may be increased and the active area may be reduced.

The nonvolatile memory device 100 according to an example implementation may include two independent column address control circuits for reading and writing, an output portion for reading divided page data based on address control for reading, a register for storing the encoding data of the read data, and a page buffer input/output circuit including an input portion for overwriting encoding data based on address control for writing.

Figure 11A:
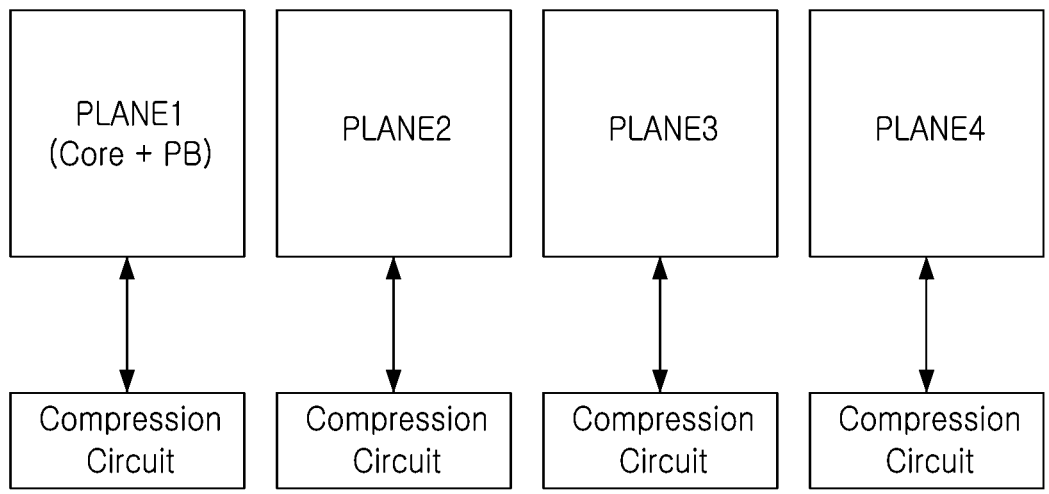
FIGS. 11A, 11B, and 11C are diagrams illustrating a relationship between a compression circuit and a plane.
Figure 11B:
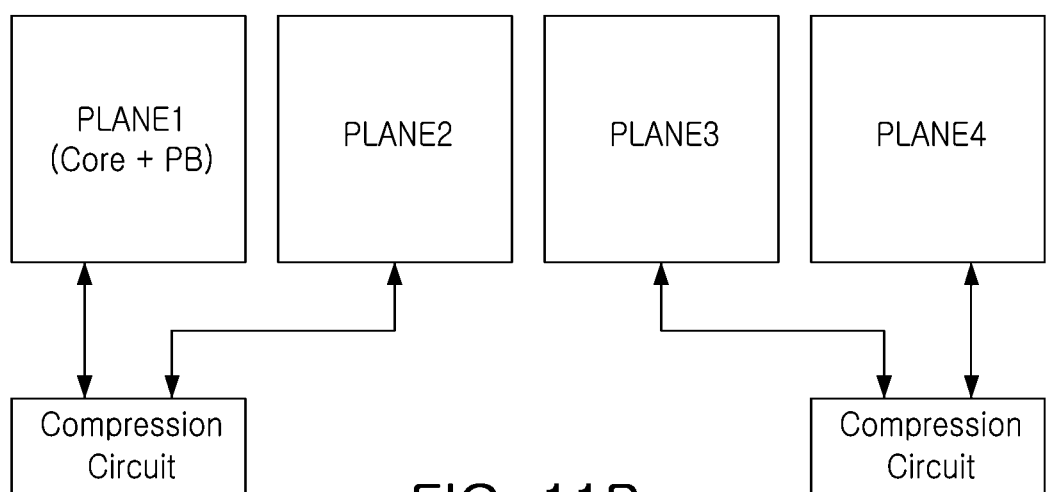
Figure 11C:
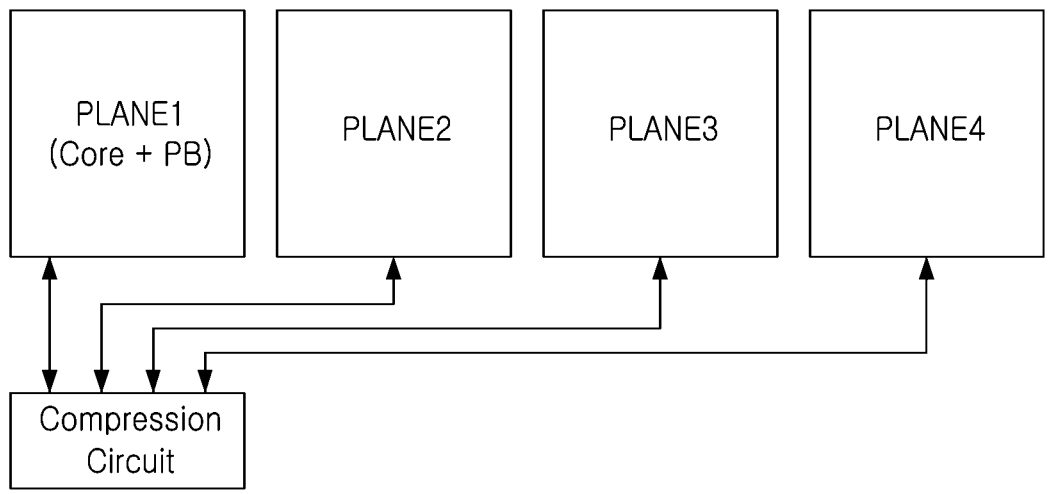

FIGS. 11A, 11B, and 11C are diagrams illustrating a relationship between a compression circuit and a plane. In an example implementation, as illustrated in FIG. 11A, a compression circuit may be disposed on each of the planes (core+page buffer circuit). In another implementation, as illustrated in FIG. 11B, the compression circuit may be disposed in a structure in which two planes are shared. In another implementation, as illustrated in FIG. 11C, the compression circuit may be disposed in a structure in which four planes are shared. However, an implementation thereof is not limited thereto, and a compression circuit shared by at least two planes may be disposed and a clock may be generated appropriately.

Figure 12:
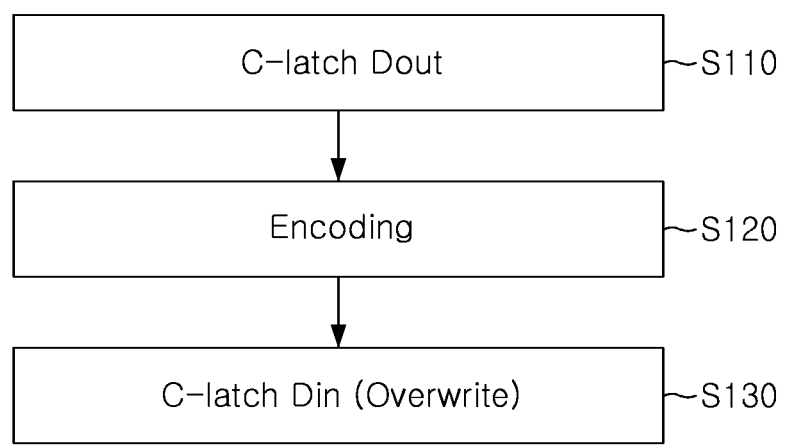
FIG. 12 is a flowchart illustrating operations of an example nonvolatile memory device.

FIG. 12 is a flowchart illustrating operations of a nonvolatile memory device 100 according to an example. Referring to FIGS. 1 to 12, the nonvolatile memory device 100 may perform C-latch write and read operations as below. Soft decision data may be output from a C-latch under a first address control (S110). Soft decision data may be compressed according to a compression ratio by an encoder (S120). Compressed data may be overwritten in C-latch under a second address control (S130). In an example, the first address control and the second address control may be separated from each other. In another example, cache latches may be divided into a plurality of sectors. In an example, soft decision data may be output from corresponding latches while moving a first address pointer from a start point of the corresponding sector to a last point of the sector among the plurality of sectors under the first address control. In another example, the compressed data may be stored in registers. In an example, data in registers may be overwritten to a portion of latches by moving the second address pointer by a predetermined amount from a start point of the sector under a second address control. In another example, the first address control and the second address control may be the same or may be different from each other.

Figure 13:
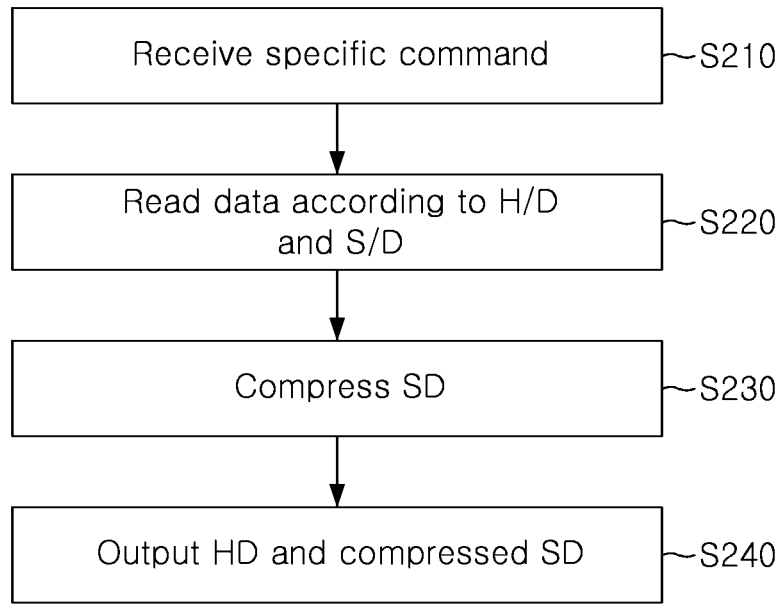
FIG. 13 is a flowchart illustrating operations of an example nonvolatile memory device.

FIG. 13 is a flowchart illustrating operations of a nonvolatile memory device 100 according to another example implementation. Referring to FIGS. 1 to 10 and 13, a data output operation of the nonvolatile memory device 100 may be performed as below. The nonvolatile memory device 100 may receive a special command from an external device (S210). Here, the special command may be configured to indicate a reliability read operation. The nonvolatile memory device 100 may read data using a hard decision method and may read data using a soft decision method in response to a special command (S220). The nonvolatile memory device 100 may compress soft decision data SD read by the soft decision method (S230). The nonvolatile memory device 100 may output hard decision data and compressed soft decision data to an external device (S240).

In FIG. 13, after compressing the soft decision data, the hard decision data and the compressed soft decision data may be output. However, the order of compression of soft decision data, outputting of hard decision data, and outputting of compressed soft decision data is not limited thereto. In an implementation, the nonvolatile memory device 100 may, for instance, read hard decision/soft decision data in response to a special command, may compress the soft decision data, may output the compressed soft decision data to an external device, and may output the hard decision data to an external device. In another example, the nonvolatile memory device 100 may, for instance, read hard decision/soft decision data in response to a special command, may output the hard decision data to an external device, may compress the soft decision data, and may output the compressed soft decision data to an external device.

Figure 14:
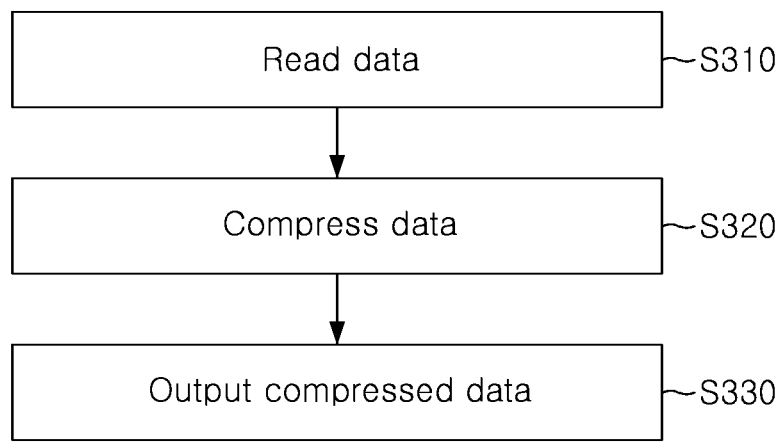
FIG. 14 is a flowchart illustrating operations of an example nonvolatile memory device.

FIG. 14 is a flowchart illustrating operations of a nonvolatile memory device 100 according to another implementation. Referring to FIGS. 1 to 10 and 14, a data output operation of the nonvolatile memory device 100 may be performed as below. The nonvolatile memory device 100 may read data (S310). The nonvolatile memory device 100 may compress the read data (S320). The nonvolatile memory device 100 may output the compressed data to an external device (S330).

Figure 15:
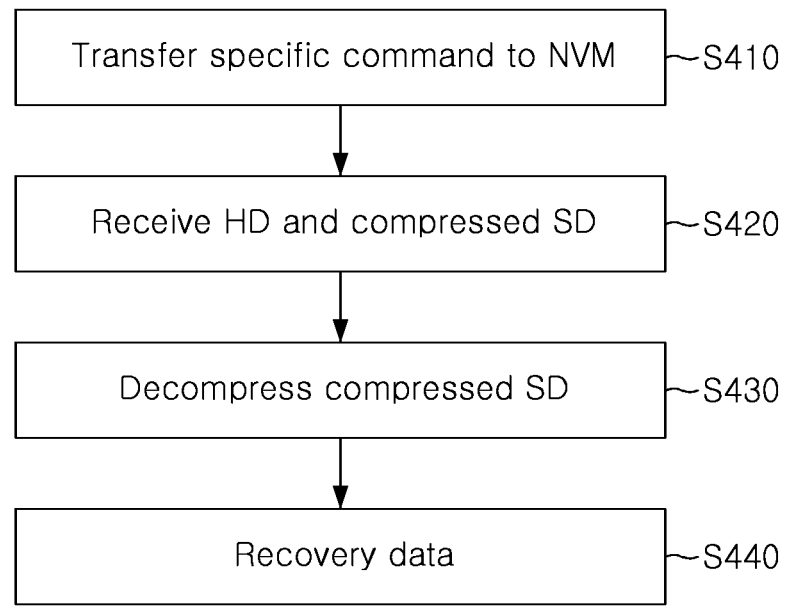
FIG. 15 is a flowchart illustrating operations of an example controller.

FIG. 15 is a flowchart illustrating operations of a controller 200 according to an implementation. Referring to FIGS. 1 to 10 and 15, operations of the controller 200 may be performed as below. The controller 200 may transmit a special command to a nonvolatile memory device 100 (NVM) (S410). For example, when errors in reading data by a first read method are not able to be corrected, the controller 200 may issue a special command corresponding to a second read method to read the data more precisely. The controller 200 may receive hard decision data HD and compressed soft decision data (compressed SD) from the nonvolatile memory device 100 (S420). The controller 200 may decompress the compressed soft decision data (compressed SD) (S430). The controller 200 may recover data using the decompressed soft decision data (decompressed SD) and the hard decision data HD (S440).

Figure 16:
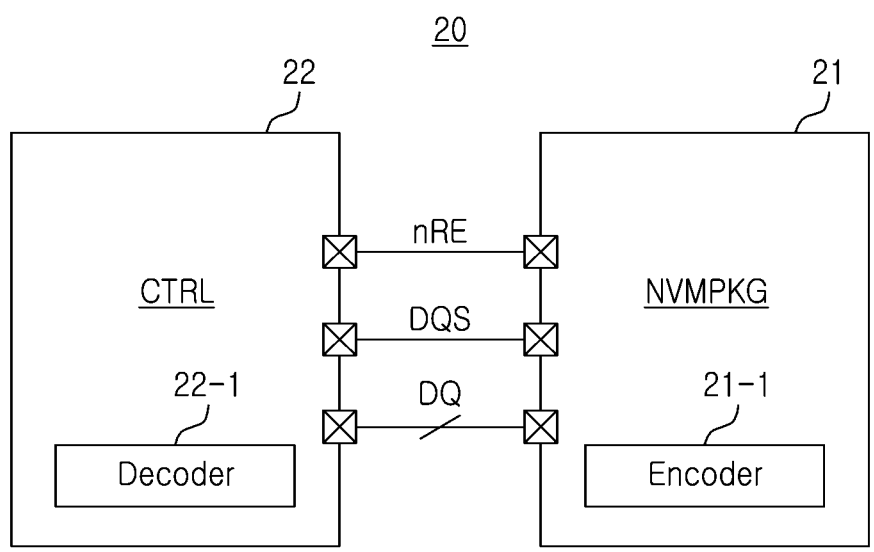
FIG. 16 is a diagram illustrating an example storage device.

FIG. 16 is a diagram illustrating a storage device 20 according to an implementation. Referring to FIG. 16, the storage device 20 may include a nonvolatile memory package 21 (NVM PKG) and a controller 22 (CTRL) controlling the nonvolatile memory package 21.

The nonvolatile memory package 21 (NVMPKG) may include an interface chip (frequency boosting interface chip (FBI), or "buffer chip") and a plurality of nonvolatile memory devices connected to internal channels. In an implementation, the nonvolatile memory package 21 may include an encoder 21-1 for compressing data based on a compression algorithm as described in FIGS. 1 to 15. In an example, in encoder 21-1, address control of an output operation and address control of an input operation may operate independently. In another example implementation, an interface chip may be connected to the controller 22 through a channel. Here, the channel may be connected to the first internal channel or the second internal channel through an interface chip. Here, the interface chip may include a retraining check circuit for internally determining the need for retraining. Also, the interface chip may implement an interface protocol for communicating with the controller 22 and an interface protocol for communicating with nonvolatile memory devices in a compatible manner. A plurality of nonvolatile memory devices may be connected to the internal channels, respectively. In an example implementation, the nonvolatile memory devices of the nonvolatile memory package 21 may be implemented in a stacked structure.

The controller 22 (CTRL) may be implemented to control overall operations of the nonvolatile memory package 21. The controller 22 may perform functions necessary for data management of the nonvolatile memory package 21, such as address mapping, error correction, garbage collection, wear-leveling, bad block management, or data recovery. Here, these functions may be implemented in terms of hardware, software, or firmware. Also, the controller 22 may include a decoder 22-2 for decompressing compressed data as described in FIGS. 1 to 15.

Figure 17:
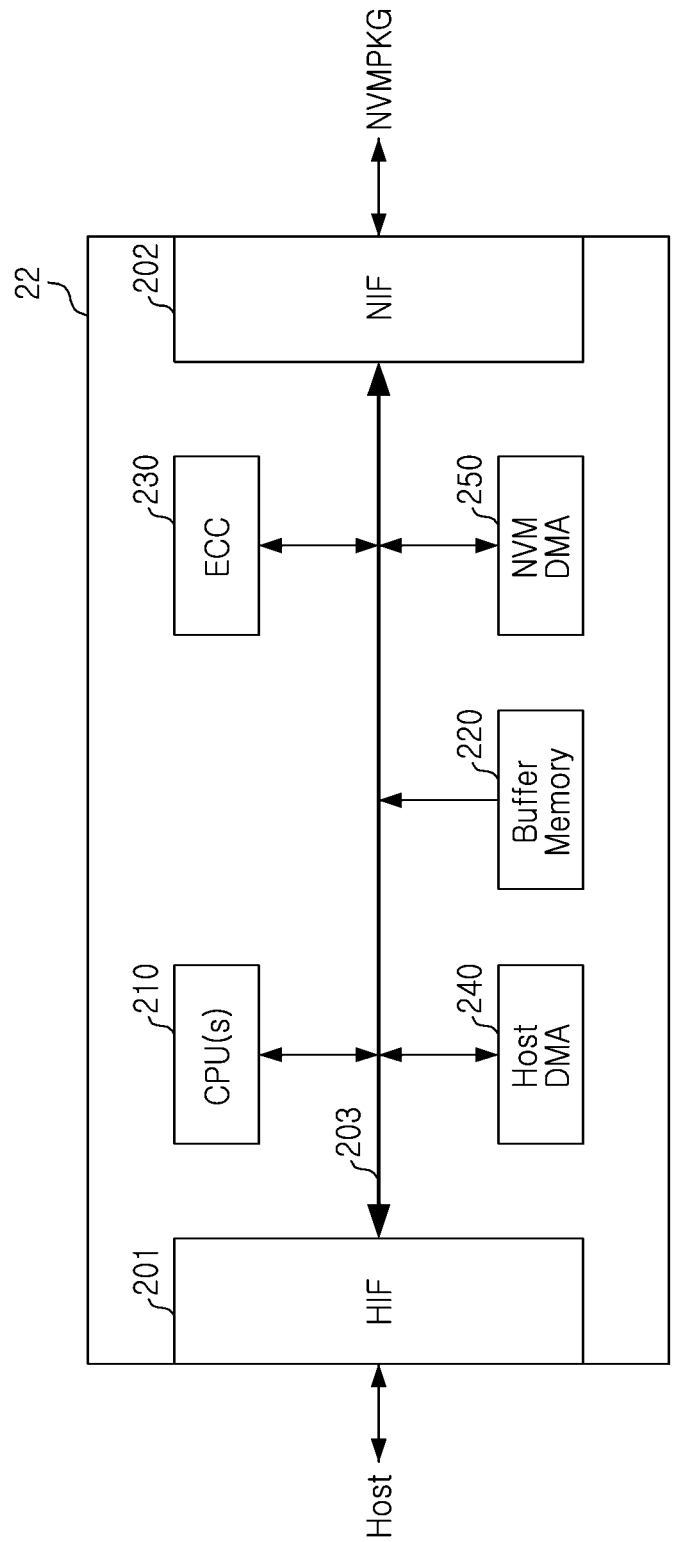
FIG. 17 is a diagram illustrating an example controller.

FIG. 17 is a diagram illustrating a controller 22 according to an example implementation. Referring to FIG. 17, the controller 22 may include a host interface circuit 201, a nonvolatile memory interface circuit 202 (NIF), a bus 203, at least one processor 210 (CPCs), a buffer memory 220, an error correction circuit 230 (ECC), a host DMA circuit 240 and a nonvolatile memory DMA circuit 250.

The host interface circuit 201 may be implemented to transmit/receive packets with a host. A packet transmitted from the host to the host interface circuit 201 may include a command or write data to a nonvolatile memory device. A packet transmitted from the host interface circuit 201 to the host may include a response to a command or read data from a nonvolatile memory device.

The nonvolatile memory interface circuit 202 may transmit write data to the nonvolatile memory 100 or may receive read data from the nonvolatile memory 100. The nonvolatile memory interface circuit 202 may be implemented to comply with standard protocols such as JDEC Toggle or ONFI.

At least one processor 210 (CPU(s)) may be implemented to control overall operations of the storage device 20. The processor 210 may perform various management such as cache/buffer management, firmware management, garbage collection management, wear leveling management, data deduplication management, read refresh/reclaim management, bad block management, multi-stream management, mapping management between host data and nonvolatile memory, quality of service (QOS) management, system resource allocation management, nonvolatile memory queue management, read level management, erase/program management, hot/cold data management, power loss protection management, dynamic thermal management, initialization management, and redundant array of inexpensive disk (RAID) management. These management operations may be implemented in terms of hardware/firmware/software.

The buffer memory 220 may temporarily store data to be written to a nonvolatile memory device or read data from a nonvolatile memory device. In an example, the buffer memory 220 may be configured as a component included in the controller 22. In another example, the buffer memory 220 may be disposed externally of the controller 22. Also, the buffer memory 220 may be implemented as a volatile memory (e.g. static random access memory (SRAM), dynamic RAM (DRAM), synchronous RAM (SDRAM), or the like) or a nonvolatile memory (flash memory, phase-change RAM (PRAM)), magneto-resistive RAM (MRAM), resistive RAM (ReRAM), ferroelectric RAM (FRAM), or the like).

The error correction circuit 230 may generate an error correction code (ECC) during a program operation and may restore data using the error correction code during a read operation. That is, the error correction circuit 230 may generate an error correction code ECC for correcting a failed bit or an error bit of data received from a nonvolatile memory device. Also, the error correction circuit 230 may form data to which parity bits are added by performing error correction encoding on data provided to the nonvolatile memory device. Parity bits may be stored in the nonvolatile memory device 100. Also, the error correction circuit 230 may perform error correction decoding on data output from a nonvolatile memory device. The error correction circuit 230 may correct errors using parity. The error correction circuit 230 may correct an error using a low density parity check (LDPC) code, a BCH code, a turbo code, a Reed- Solomon code, a convolution code, a recursive systematic code (RSC), and coded modulation such as trellis-coded modulation (TCM), and block coded modulation (BCM). When error correction is impossible in the error correction circuit 230, a read retry operation may be performed.

A packet manager may generate a packet according to protocol of an interface negotiated with the host or parse various data from a packet received from the host. The encryption device may perform at least one of an encryption operation and a decryption operation on data input to the controller 22 using, for example, a symmetric-key algorithm. The encryption device may perform encryption and decryption of data using the advanced encryption standard (AES) algorithm. An encryption device may include an encryption module and a decryption module. In an example, an encryption device may be implemented in terms of hardware/software/firmware. The encryption device may perform a self-encryption disk (SED) function or a trusted computing group (TCG) security function. The SED function may store encrypted data in a nonvolatile memory device using an encryption algorithm or decrypt encrypted data from a nonvolatile memory device. The encryption/decryption operation may be performed using an internally generated encryption key. The TCG security function may provide a mechanism enabling access control to user data of the storage device 20. For example, the TCG security function may perform an authentication procedure between an external device and the storage device 20. In an example, the SED function or TCG security function may be optionally selected.

The host DMA circuit 240 may be implemented to control a DMA operation between the host device and the controller 22. The host DMA circuit 240 may perform an operation of storing data input from a host device through the host interface circuit 201 in the buffer memory 220 during a program operation under control of a host controller. Also, the host DMA circuit 240 may perform an operation of outputting data stored in the buffer memory 220 to a host device through the host interface circuit 201 during a read operation. In an example, the host DMA circuit 240 may be included in the host controller as a component of the host controller.

The nonvolatile memory DMA circuit 250 may be implemented to control a DMA operation between the controller 22 and the nonvolatile memory device. The nonvolatile memory DMA circuit 250 may perform an operation of outputting data stored in the buffer memory 220 to a nonvolatile memory device through the nonvolatile memory interface circuit 202 during a program operation under control of a nonvolatile memory controller. Also, the nonvolatile memory DMA circuit 250 may perform an operation of reading data stored in a nonvolatile memory device through the nonvolatile memory interface circuit 202 during a read operation.

Figure 18:
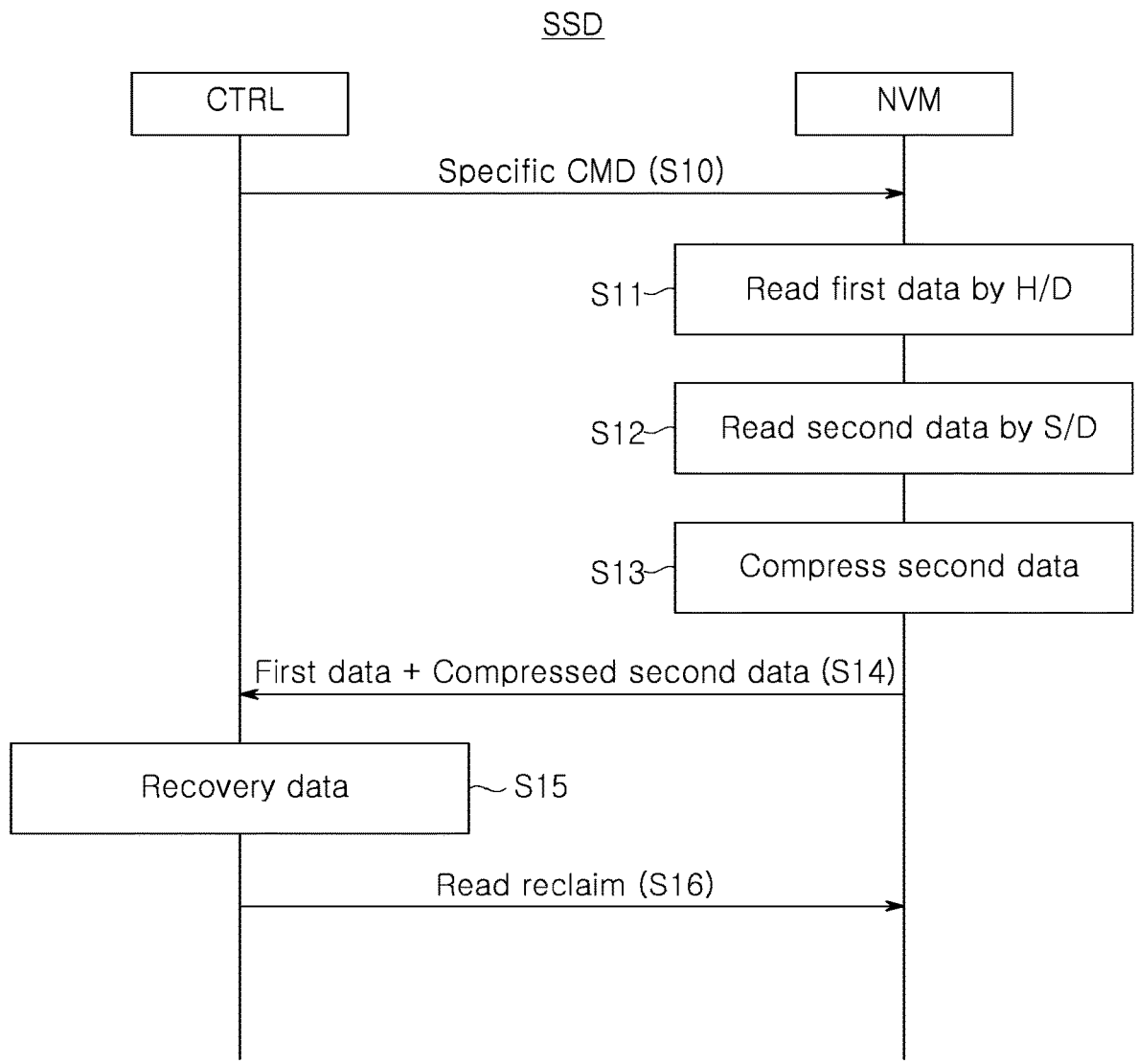
FIG. 18 is a ladder diagram illustrating an example read operation of a storage device.

FIG. 18 is a ladder diagram illustrating a read operation of a storage device according to an implementation. Referring to FIG. 18, a read operation of a storage device SSD may be performed as below. The controller CTRL may output a special command to the nonvolatile memory device NVM (S10). The nonvolatile memory device NVM may receive a special command and may read first read data using a hard decision method (H/D) in response to the special command (S11). Also, the nonvolatile memory device NVM may read second read data using a soft decision method (S/D) in response to a special command (S12). In an example, a read operation may be performed using the hard decision method (H/D), and then a read operation may be performed using the soft decision method (S/D). In another example, a read operation may be performed using the soft decision method (S/D), and then a read operation may be performed using the hard decision method (H/D). That is, the order of S11 and S12 may be switched with each other.

Thereafter, the nonvolatile memory device NVM may compress second data (S13). In an example, the second data may be stored in cache latches, the data of a sector unit may be output in response to an output address from the cache latches, the data of the output sector unit may be compressed, and the compressed data may be overwritten to a portion of the cache latches in response to an input address. In an example, data may be output from corresponding cache latches while moving a first address pointer from a start point of a sector to a last point. In an example, overwriting to the cache latches of a corresponding portion may be performed while moving a second address pointer from a start point of a sector to a point at which a predetermined amount is added to the start point. In an example implementation, the first address pointer and the second address pointer may be controlled independently. In an example implementation, the start column address for each sector may be the same before and after the compressing operation. In another example implementation, the start column address may be different for each sector before and after the compressing operation.

Thereafter, the nonvolatile memory device NVM may output first data and compressed second data using the controller CTRL (S14). The controller CTRL may recover data using the first data and the compressed second data (S15). The controller CTRL may output a read reclaim request to the nonvolatile memory device NVM using the recovered data (S16). The nonvolatile memory device NVM may perform a read reclaim operation using the recovered data.

Figure 19:
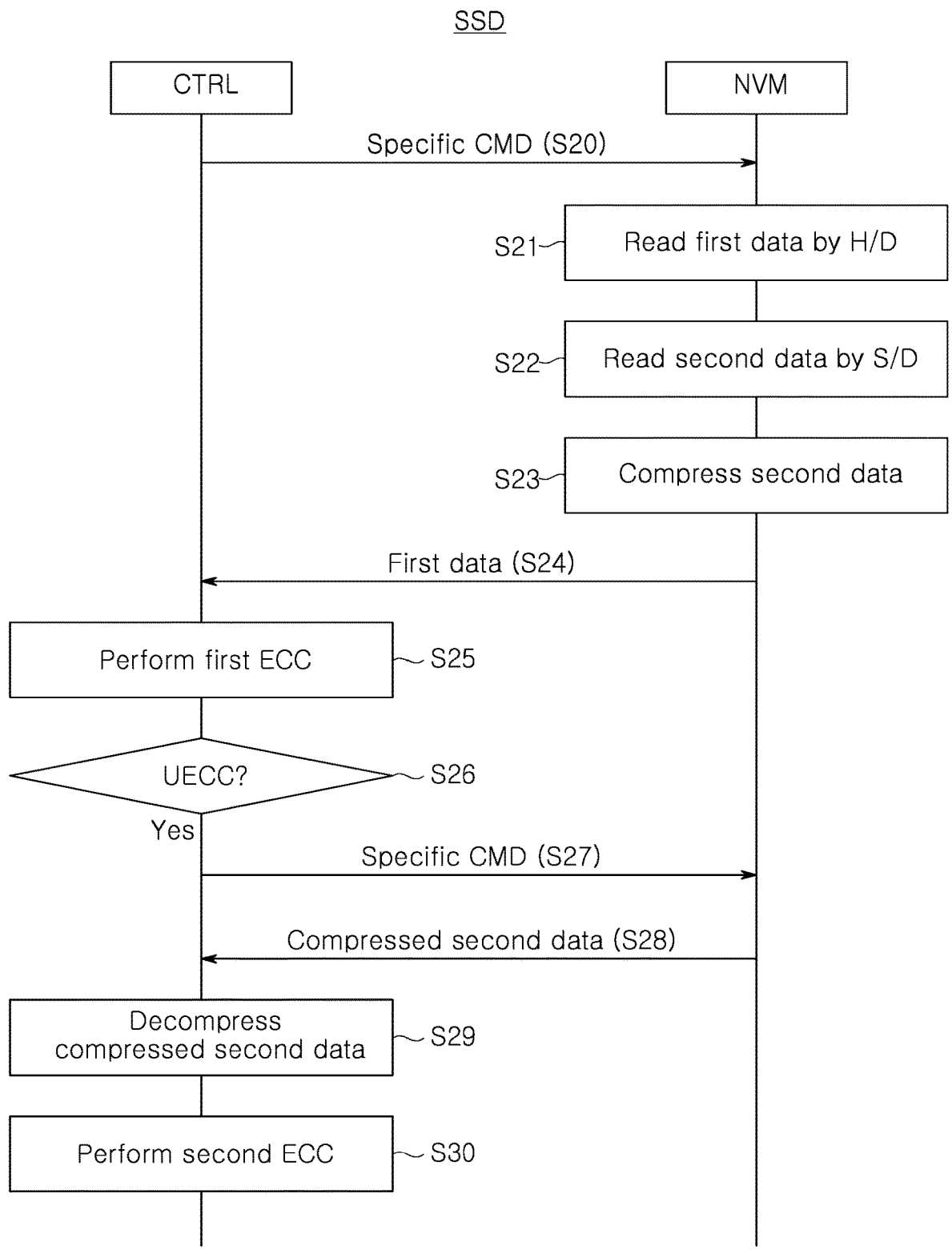
FIG. 19 is a ladder diagram illustrating an example read operation of a storage device.

FIG. 19 is a ladder diagram illustrating a read operation of a storage device according to another example implementation. Referring to FIG. 19, a read operation of a storage device SSD may be performed as below.

The controller CTRL may output a read command to the nonvolatile memory device NVM (S20). The nonvolatile memory device NVM may read first data using a hard decision method (H/D) in response to the read command (S21). Also, the nonvolatile memory device NVM may read second data using a soft decision method (S/D) in response to the read command (S22). The nonvolatile memory device NVM may compress second data (S23). The nonvolatile memory device NVM may output first data using the controller CTRL (S24).

The controller CTRL may perform a first error correction operation on the first data (S25). When error correction (UECC) is not possible according to the result of the first error correction operation (S26), the controller CTRL may output a special command to the nonvolatile memory device NVM (S27). The nonvolatile memory device NVM may output compressed second data using the controller CTRL in response to the special command (S28). Thereafter, the controller CTRL may decompress the compressed second data (S29). Thereafter, the controller CTRL may perform a second error correction operation on the decompressed second data (S30).

Meanwhile, a nonvolatile memory device may be implemented as a vertical memory device.

Figure 20:
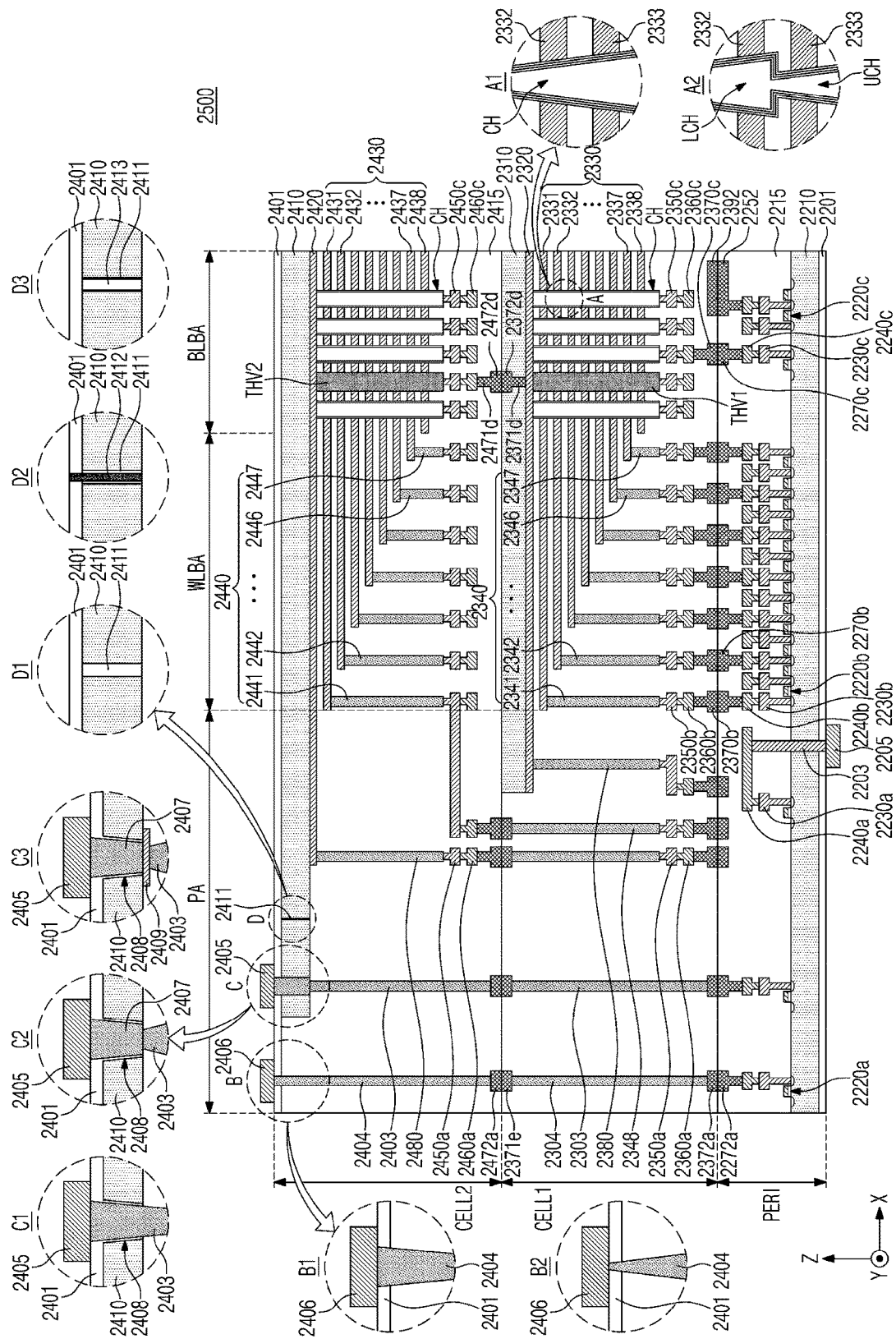
FIG. 20 is a diagram illustrating an example vertical nonvolatile memory device.

FIG. 20 is a diagram illustrating a vertical nonvolatile memory device according to an example implementation. Referring to FIG. 20, a nonvolatile memory device 2500 may have a chip to chip (C2C) structure. Here, the C2C structure may include manufacturing at least one upper chip including a cell region CELL and a lower chip including a peripheral circuit region PERI, respectively, and connecting at least one upper chip and one lower chip to each other by bonding. In an example, the bonding method may refer to a method of electrically or physically connecting the bonding metal pattern formed on the lowermost metal layer of the upper chip to the bonding metal pattern formed on the uppermost metal layer of the lower chip. For example, when the bonding metal patterns are formed of copper (Cu), the bonding method may be a Cu—Cu bonding method. In another example, bonding metal patterns may also be formed of aluminum (Al) or tungsten (W).

The nonvolatile memory device 2500 may include at least one upper chip including a cell region. For example, as illustrated in FIG. 20, a nonvolatile memory device 2500 may be implemented to include two upper chips. However, this is merely an example, and the number of upper chips is not limited thereto. When the nonvolatile memory device 2500 is implemented to include two upper chips, the nonvolatile memory device 2500 may be manufactured by manufacturing a first upper chip including a first cell region CELL1, a second upper chip including a second cell region CELL2 and a lower chip including a peripheral circuit region PERI, respectively, and connecting the first upper chip, the second upper chip and the lower chip to each other by bonding. The first upper chip may be inverted and connected to the lower chip by bonding, and the second upper chip may also be inverted and connected to the first upper chip by bonding. In the description below, the upper portion and the lower portion of the first and second upper chips may be defined with respect to the state before the first upper chip and the second upper chip are inverted. That is, in FIG. 20, the upper portion of the lower chip may refer to the upper portion defined in the +Z-axis direction, and the upper portion of each of the first and second upper chips may refer to the upper portion defined in the −Z-axis direction. However, this is merely an example, and only one of the first upper chip and the second upper chip may be inverted and connected to each other by bonding.

Each of the peripheral circuit region PERI and the first and second cell regions CELL1 and CELL2 of the nonvolatile memory device 2500 may include an external pad bonding region PA, a wordline bonding region WLBA, and a bitline bonding region BLBA. The peripheral circuit region PERI may include a first board 2210 and a plurality of circuit devices 2220a, 2220b, and 2220c formed on the first board 2210. An interlayer insulating layer 2215 including one or more insulating layers may be provided on the plurality of circuit devices 2220a, 2220b, and 2220c, and a plurality of metal wirings may be provided in the interlayer insulating layer 2215 to connect the plurality of circuit devices 2220a, 2220b, and 2220c. For example, the plurality of metal wirings may include first metal wirings 2230a, 2230b, and 2230c connected to a plurality of circuit devices 2220a, 2220b, and 2220c, and second metal wirings 2240a, 2240b, and 2240c formed on first metal wirings 2230a, 2230b, and 2230c. The plurality of metal wirings may be formed of at least one of various conductive materials. For example, the first metal wirings 2230a, 2230b, and 2230c may be formed of tungsten having relatively high electrical resistivity, and the second metal wirings 2240a, 2240b, and 2240c may be formed of copper having relatively low electrical resistivity.

Here, only the first metal wiring 2230a, 2230b, and 2230c and the second metal wiring 2240a, 2240b, and 2240c are described, but implementations thereof are not limited thereto, and at least one additional metal wiring may be further formed on the second metal wirings 2240a, 2240b, and 2240c. In such a case, the second metal wirings 2240a, 2240b, and 2240c may be formed of aluminum. Also, in such a case, at least a portion of the additional metal wiring formed on the second metal wirings 2240a, 2240b, and 2240c may be formed of copper having lower electrical resistivity than that of aluminum of the second metal wirings 2240a, 2240b, and 2240c.

Each of the first and second cell regions CELL1 and CELL2 may include at least one memory block. The first cell region CELL1 may include a second board 2310 and a common source line 2320. On the second board 2310, a plurality of wordlines 2331 to 2338 (2330) may be stacked in the direction (Z-axis direction) perpendicular to the upper surface of the second board 2310. String select lines and ground select lines may be disposed above and below the wordlines 2330, and a plurality of wordlines 2330 may be disposed between the string select lines and the ground select line. Similarly, the second cell region CELL2 may include a third board 2410 and a common source line (2420), and a plurality of wordlines 2431 to 2438 (2430) may be stacked in a direction (Z-axis direction) perpendicular to the upper surface of the third board 2410. The second board 2310 and the third board 2410 may be formed of various materials, for example, a board having a single crystal epitaxial layer grown on a silicon board, a silicon-a germanium board, a germanium board, or a monocrystalline silicon board. A plurality of channel structures CHs may be formed in each of the first and second cell regions CELL1 and CELL2.

As illustrated in the example of FIG. 20, A1, the channel structure CH may be provided in the bitline bonding region BLBA and may extend in a direction perpendicular to the upper surface of the second board 2310 and may penetrate through the wordlines 2330, string select lines, and ground select lines. The channel structure CH may include a data storage layer, a channel layer, and a buried insulating layer. The channel layer may be electrically connected to the first metal wiring 2350c and to the second metal wiring 2360c in a bitline bonding region BLBA. For example, the second metal wiring 2360c may be a bitline and may be connected to the channel structure CH through the first metal wiring 2350c. The bitline 2360c may extend in a first direction (Y-axis direction) parallel to the upper surface of the second board 2310.

In an example, as illustrated in A2, the channel structure CH may include a lower channel LCH and an upper channel UCH connected to each other. For example, the channel structure CH may be formed through a process for a lower channel LCH and a process for an upper channel UCH. The lower channel LCH may extend in a direction perpendicular to the upper surface of the second board 2310 and may penetrate through the common source line 2320 and the lower wordlines 2331 and 2332. The lower channel LCH may include a data storage layer, a channel layer and a buried insulating layer, and may be connected to an upper channel UCH. The upper channel UCH may penetrate through upper wordlines 2333-2338. The upper channel UCH may include a data storage layer, a channel layer and a buried insulating layer, and the channel layer of the upper channel UCH may be electrically connected to the first metal wiring 2350c and the second metal wiring 2360c. As the length of the channel increases, it may be difficult to form a channel having a constant width due to reasons related to processes. The example nonvolatile memory device 2500 may include a channel having improved width uniformity through a lower channel LCH and an upper channel UCH formed through sequential processes.

As illustrated in FIG. 20, A2, when the channel structure CH is formed to include a lower channel LCH and an upper channel UCH, a wordline disposed neighboring to the boundary of the lower channel LCH and the upper channel UCH may be a dummy wordline. For example, the wordline 2332 and the wordline 2333 forming the boundary between the lower channel LCH and the upper channel UCH may be dummy wordlines. In this case, data may not be stored in the memory cells connected to the dummy wordline. Alternatively, the number of pages corresponding to memory cells connected to a dummy wordline may be fewer than the number of pages corresponding to memory cells connected to a general wordline. The voltage level applied to the dummy wordline may be different from the voltage level applied to the general wordline, and accordingly, the effect of the non-uniform channel width between the lower channel LCH and the upper channel UCH on the operation of the memory device may be reduced.

Meanwhile, in A2, the number of lower wordlines 2331 and 2332 through which the lower channel LCH penetrates may be less than the number of upper wordlines 2333-2338 through which the upper channel UCH penetrates. However, this is merely an example, and implementations thereof are not limited thereto. In another example, the number of lower wordlines penetrating through the lower channel LCH may be equal to or greater than the number of upper wordlines penetrating through the upper channel UCH. Also, the structure and connection relationship of the channel structure CH disposed in the first cell region CELL1 described above may be applied to the channel structure CH disposed in the second cell region CELL2.

In the bitline bonding region BLBA, a first through-electrode THV1 may be provided in a first cell region CELL1, and a second through-electrode THV2 may be provided in a second cell region CELL2. As illustrated in FIG. 20, a first through-electrode THV1 may penetrate through a common source line 2320 and a plurality of wordlines 2330. However, this is merely an example, and the first through-electrode THV1 may further penetrate through the second board 2310. The first through-electrode THV1 may include a conductive material. Alternatively, the first through-electrode THV1 may include a conductive material surrounded by an insulating material. The second through-electrode THV2 may also be provided in the same form and structure as those of the first through-electrode THV1.

In an example implementation, the first through-electrode THV1 and the second through-electrode THV2 may be electrically connected through a first through-metal pattern 2372$d$ and a second through-metal pattern 2472$d$. The first through-metal pattern 2372$d$ may be formed on the lower end of the first upper chip including the first cell region CELL1, and the second through-metal pattern 2472$d$ may be formed on the upper end of the second upper chip including the second cell region CELL2. The first through-electrode THV1 may be electrically connected to the first metal wiring 2350$c$ and the second metal wiring 2360$c$. A lower via 2371$d$ may be formed between the first through-electrode THV1 and the first through-metal pattern 2372$d$, and an upper via 2471$d$ may be formed between the second through-electrode THV2 and the second through-metal pattern 2472$d$. The first through-metal pattern 2372$d$ and the second through-metal pattern 2472$d$ may be connected to each other by bonding.

Also, in the bitline bonding region BLBA, an upper metal pattern 2252 may be formed on the uppermost metal layer of the peripheral circuit region PERI, and an upper metal pattern 2392 having the same shape as that of the upper metal pattern 2252 may be formed in the uppermost metal layer of the first cell region CELL1. The upper metal pattern 2392 of the first cell region CELL1 and the upper metal pattern 2252 of the peripheral circuit region PERI may be electrically connected to each other by bonding. In the bitline bonding region BLBA, the bitline 2360$c$ may be electrically connected to a page buffer included in the peripheral circuit region PERI. For example, a portion of the circuit devices 2220$c$ of the peripheral circuit region PERI may provide a page buffer, and the bitline 2360$c$ may be electrically connected to circuit devices 2220$c$ providing a page buffer through the upper bonding metal 2370$c$ of the first cell region CELL1 and the upper bonding metal 2270$c$ of the peripheral circuit region PERI.

Referring to FIG. 20, in the wordline bonding region WLBA, the wordlines 2330 of the first cell region CELL1 may extend in a second direction (X-axis direction) parallel to the upper surface of the second board 2310 and may be connected to a plurality of cell contact plugs 2341-2347 (2340). A first metal wiring 2350$b$ and a second metal wiring 2360$b$ may be connected in sequence to an upper portion of the cell contact plugs 2340 connected to the wordlines 2330. The cell contact plugs 2340 may be connected to the peripheral circuit region PERI through the upper bonding metal 2370$b$ of the first cell region CELL1 and the upper bonding metal 2270$b$ of the peripheral circuit region PERI in the wordline bonding region WLBA.

The cell contact plugs 2340 may be electrically connected to a raw decoder included in a peripheral circuit region PERI. For example, a portion of the circuit devices 2220$b$ of the peripheral circuit region PERI may provide a raw decoder, and the cell contact plugs 2340 may be electrically connected to the circuit devices 2220$b$ providing the raw decoder through the upper bonding metal 2370$b$ of the first cell region CELL1 and the upper bonding metal 2270$b$ of the peripheral circuit region PERI. In an example, an operation voltage of the circuit devices 2220$b$ providing a raw decoder may be different from an operation voltage of the circuit devices 2220$c$ providing a page buffer. For example, an operation voltage of the circuit devices 2220$c$ providing a page buffer may be higher than an operation voltage of the circuit devices 2220$b$ providing a raw decoder.

Similarly, in the wordline bonding region WLBA, the wordlines 2430 of the second cell region CELL2 may extend in the second direction (X-axis direction) parallel to the upper surface of the third board 2410 and may be connected to a plurality of cell contact plugs 2440 (2441-2447). The cell contact plugs 2440 may be connected to the peripheral circuit region PERI through an upper metal pattern of the second cell region CELL2, a lower metal pattern and an upper metal pattern of the first cell region CELL1, and a cell contact plug 2348.

In the wordline bonding region WLBA, an upper bonding metal 2370$b$ may be formed in a first cell region CELL1, and an upper bonding metal 2270$b$ may be formed in a peripheral circuit region PERI. The upper bonding metal 2370$b$ of the first cell region CELL1 and the upper bonding metal 2270$b$ of the peripheral circuit region PERI may be electrically connected to each other by bonding. The upper bonding metal 2370$b$ and the upper bonding metal 2270$b$ may be formed of aluminum, copper, or tungsten.

In the external pad bonding region PA, a lower metal pattern 2371$e$ may be formed in the lower portion of the first cell region CELL1, and an upper metal pattern (2472$a$) may be formed in the upper portion of the second cell region CELL2. The lower metal pattern 2371e of the first cell region CELL1 and the upper metal pattern 2472a of the second cell region CELL2 may be connected to each other by bonding in the external pad bonding region PA. Similarly, an upper metal pattern 2372a may be formed on the first cell region CELL1, and an upper metal pattern 2272a may be formed on the peripheral circuit region PERI. The upper metal pattern 2372a of the first cell region CELL1 and the upper metal pattern 2272a of the peripheral circuit region PERI may be connected to each other by bonding.

Common source line contact plugs 2380 and 2480 may be disposed in the external pad bonding region PA. The common source line contact plugs 2380 and 2480 may be formed of a conductive material such as metal, metal compound, or doped polysilicon. The common source line contact plug 2380 of the first cell region CELL1 may be electrically connected to the common source line 2320, and the common source line contact plug 2480 of the second cell region CELL2 may be electrically connected to the common source line 2420. A first metal wiring 2350a and a second metal wiring (2360a) may be stacked in sequence on the common source line contact plug 2380 of the first cell region CELL1, and a first metal wiring 2450a and a second metal wiring 2460a may be stacked in sequence on the common source line contact plug 2480 of the second cell region CELL2.

The input/output pads 2205, 2405, and 2406 may be disposed in the external pad bonding region PA. Referring to FIG. 20, a lower insulating film 2201 may cover the lower surface of the first board 2210, and a first input/output pad 2205 may be formed on the lower insulating film 2201. The first input/output pad 2205 may be connected to at least one of the plurality of circuit devices 2220a disposed in the peripheral circuit region PERI through the first input/output contact plug 2203 and may be isolated from the first board 2210 by a lower insulating film 2201. Also, a side insulating film may be disposed between the first input/output contact plug 2203 and the first board 2210 and may electrically isolate the first input/output contact plug 2203 and the first board 2210 from each other.

An upper insulating film 2401 covering an upper surface of the third board 2410 may be formed above the third board 2410. A second input/output pad 2405 or a third input/output pad 2406 may be disposed on the upper insulating film 2401. The second input/output pad 2405 may be connected to at least one of a plurality of circuit devices 2220a disposed in the peripheral circuit region PERI through the second input/output contact plugs 2403 and 2303, and the third input/output pad 2406 may be connected to at least one of the plurality of circuit devices 2220a arranged in the peripheral circuit region PERI through the third input/output contact plugs 2404 and 2304.

In an example implementation, the third board 2410 may not be disposed in a region in which an input/output contact plug is disposed. For example, as illustrated in B, the third input/output contact plug 2404 may be isolated from the third board 2410 in a direction parallel to the upper surface of the third board 2410 and may penetrate through the interlayer insulating layer 2415 of the second cell region CELL2 and may be connected to the third input/output pad 2406. In this case, the third input/output contact plug 2404 may be formed through various processes.

For example, as illustrated in B1, the third input/output contact plug 2404 may extend in the third direction (Z-axis direction) and may have a diameter increasing toward the upper insulating film 2401. That is, while the diameter of the channel structure CH described in A1 is formed to decrease toward the upper insulating film 2401, the diameter of the third input/output contact plug 2404 may increase toward the upper insulating film 2401. For example, the third input/output contact plug 2404 may be formed after the second cell region CELL2 and the first cell region CELL1 are bonded to each other.

Also, as an example, as illustrated in B2, the third input/output contact plug 2404 may extend in the third direction (Z-axis direction) and may have a diameter decreasing toward the upper insulating film 2401. That is, the diameter of the third input/output contact plug 2404 may decrease toward the upper insulating film 2401 similarly to the channel structure CH. For example, the third input/output contact plug 2404 may be formed together with the cell contact plugs 2440 before the second cell region CELL2 and the first cell region CELL1 are bonded to each other.

In another example, an input/output contact plug may be disposed to overlap the third board 2410. For example, as illustrated in C, the second input/output contact plug 2403 may be formed by penetrating through the interlayer insulating layer 2415 of the second cell region CELL2 in the third direction (Z-axis direction) and may be electrically connected to the second input/output pad 2405 through the third board 2410. In this case, the connection structure of the second input/output contact plug 2403 and the second input/output pad 2405 may be implemented in various manners.

For example, as illustrated in C1, an opening 2408 penetrating through the third board 2410 may be formed, and the second input/output contact plug 2403 may be directly connected to the second input/output pad 2405 through an opening 2408 formed in the third board 2410. In this case, as illustrated in C1, the diameter of the second input/output contact plug 2403 may increase toward the second input/output pad 2405. However, this is merely an example, and the diameter of the second input/output contact plug 2403 may decrease toward the second input/output pad 2405.

For example, as illustrated in C2, an opening 2408 penetrating through the third board 2410 may be formed, and a contact 2407 may be formed in the opening 2408. One end of the contact 2407 may be connected to the second input/output pad 2405, and the other end may be connected to the second input/output contact plug 2403. Accordingly, the second input/output contact plug 2403 may be electrically connected to the second input/output pad 2405 through the contact 2407 in the opening 2408. In this case, as illustrated in C2, the diameter of the contact 2407 may increase toward the second input/output pad 2405, and the diameter of the second input/output contact plug 2403 may decrease toward the second input/output pad 2405. For example, the third input/output contact plug 2403 may be formed together with the cell contact plugs 2440 before the second cell region CELL2 and the first cell region CELL1 are bonded to each other, and the contact 2407 may be formed after the second cell region CELL2 and the first cell region CELL1 are bonded to each other.

Also, as an example, as illustrated in C3, a stopper 2409 may be further formed on the upper surface of the opening 2408 of the third board 2410 as compared to C2. The stopper 2409 may be metal wiring formed on the same layer as the common source line 2420. However, this is merely an example, and the stopper 2409 may be metal wiring formed on the same layer as at least one of the wordlines 2430. The second input/output contact plug 2403 may be electrically connected to the second input/output pad 2405 through the contact 2407 and the stopper 2409.

Similarly to the second and third input/output contact plugs 2403 and 2404 of the second cell region CELL2, the second and third input/output contact plugs 2303 and 2304 of the first cell region CELL1 may have a diameter decreasing toward the lower metal pattern 2371e or a diameter increasing toward the lower metal pattern 2371e, respectively.

In an example, a slit 4111 may be formed on the third board 2410. For example, the slit 2411 may be formed in an arbitrary position of the external pad bonding region PA. In an example implementation, as illustrated in D, the slit 2411 may be disposed between the second input/output pad 2405 and the cell contact plugs 2440 when viewed from a cross-section. However, this is merely an example, and the slit 2411 may be formed such that the second input/output pad 2405 may be disposed between the slit 2411 and the cell contact plugs 2440 when viewed from a cross-section.

For example, as illustrated in D1, the slit 2411 may be formed to penetrate through the third board 2410. The slit 2411 may be used to prevent the third board 2410 from being finely split when the opening 2408 is formed. However, this is merely an example, and the slit 2411 may be formed to a depth of about 60-70% of the thickness of the third board 2410.

Also, as an example, as illustrated in D2, a conductive material 2412 may be formed in the slit 2411. The conductive material 2412 may be used, for example, to discharge leakage current generated during driving of circuit devices in an external pad bonding region PA. In this case, the conductive material 2412 may be connected to an external ground line.

As an example, as illustrated in D3, an insulating material 2413 may be formed in the slit 2411. The insulating material 2413 may electrically isolate the second input/output pad 2405 and the second input/output contact plug 2403 disposed in the external pad bonding region PA from the wordline bonding region WLBA, for example. By forming the insulating material 2413 in the slit 2411, the voltage provided through the second input/output pad 2405 may be prevented from affecting the metal layer disposed on the third board 2410 in the wordline bonding region WLBA.

In example implementations, first to third input/output pads 2205, 2405, and 2406 may be selectively formed. For example, the nonvolatile memory device 2500 may include only the first input/output pad 2205 disposed above the first board 2201, may include only the second input/output pad 2405 disposed above the third board 2410, or may include only the third input/output pad 2406 disposed above the upper insulating film 2401.

In example implementations, at least one of the second board 2310 of the first cell region CELL1 and the third board 2410 of the second cell region CELL2 may be used as a sacrificial board and may be completely or partially removed before or after the bonding process. An additional film may be deposited after removing the board. For example, the second board 2310 of the first cell region CELL1 may be removed before or after bonding between the peripheral circuit region PERI and the first cell region CELL1, and an insulating film covering the upper surface of the common source line 2320 or a conductive film for connection may be formed. Similarly, the third board 2410 of the second cell region CELL2 may be removed before or after bonding between the first cell region CELL1 and the second cell region CELL2, and an upper insulating film 2401 covering the upper surface of the common source line 2420 or a conductive film for connection may be formed.

The device described above may be implemented with hardware components, software components, and/or a combination of hardware components and software components.

For example, the device and components described in an example implementation may be implemented using one or more general-purpose or special-purpose computers such as a processor, a controller, an arithmetic logic unit (ALU), a digital signal processor, a microcomputer, a field programmable gate array (FPGA), and a programmable logic unit (PLU), a microprocessor, or any other device which may execute instructions and respond. A processing device may execute an operating system (OS) and one or more software applications running on the operating system. Also, a processing device may access, store, manipulate, process and generate data in response to the execution of software. For ease of description, a single processing device may be used, but the processing device may include a plurality of processing elements or a plurality of types of processing elements. For example, a processing device may include a plurality of processors or a processor and a controller. Also, other processing configurations, such as parallel processors, may be possible.

Software may include a computer program, codes, instructions, or a combination of one or more thereof, and may configure the processing device to operate as desired or to indicate the processing device independently or collectively. Software and/or data may be embodied in any type of machine, component, physical device, virtual equipment, computer storage medium or device to be interpreted by or to provide instructions or data to a processing device. Software may be distributed over networked computer systems and may be stored or executed in a distributed manner. Software and data may be stored on one or more computer-readable recording media.

In an example, a request for data compression (e.g., soft data) operating in a NAND die may be processed. The nonvolatile memory device, in an example, may reduce a chip size overhead of a data compression circuit. A nonvolatile memory device may consider the possibility of start column address change when outputting data before and after compression. To output compressed data externally from a chip, data may need to be stored in a C-latch. To complete compression in 1 cycle (1 page), a storage space equal to a compression ratio may be necessary, in addition to the C-latch. This storage space may be a chip size overhead for implementing a compression circuit. When outputting compressed data out of a chip, which address mapping should be supported may depend on requirements from a user. In an example, Case 1, the start column address is the same for each 4K before and after compression, but the data length is different (and thus a hardware fix is possible). In another example, Case 2, the start column addresses are different for each 4K before and after compression so that a full compressed data output may be possible with 1st 4K READ.

The nonvolatile memory device in an example implementation may include a data path circuit to independently read & write encoded data of divided pages, a sequential repetitive compression device for reading and overwriting C-latch data using two independent address control circuits, two independent address control circuits for read/write operations, a register for encoding and storing data of a specific unit after C-latch Dout, and a circuit for overwriting register data by a write address, which is independent of the read address.

In example implementations, a method of encoding and input/output of C-latch data through two independent address controls is disclosed. In an example, encoded data may be overwritten in sequence in the order of data addresses before encoding. In an example, encoded data may be overwritten by moving in order of the start address of the data before encoding. In an example, two address control circuits may separate address scramble methods of C-latch Dout/Din. Since the pointers of Dout and Din may be separated, Dout and Din may be repeated in sequence for sector data (e.g., C-latch Dout (4 KB)=>Encoding=>C-latch Din (overwrite)).

According to the aforementioned example implementations, data may be compressed and output. A cache latch may be accessed using at least two separated address controllers. In example implementations, an operation of reading data to be encoded and an operation of writing encoded data may be performed independently. In example implementations, by repeating the operation of reading data to be encoded and the operation of writing encoded data in sequence, buffer capacity for storing encoded data may be reduced.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the example implementations have been illustrated and described above, it will be configured as apparent to those skilled in the art that modifications and variations could be made without departing from the scope of the present disclosure as defined by the appended claims.

What is claimed is:

1. A nonvolatile memory device, comprising:
   a plurality of latch groups;
   an address controller configured to generate an address control signal, wherein the address control signal includes an input address and an output address, wherein the input address indicates a first latch group of the plurality of latch groups, and wherein the output address indicates a second latch group of the plurality of latch groups;
   a compression circuit configured to receive the address control signal from the address controller, to receive sector data from the second latch group corresponding to the output address among the plurality of latch groups and to compress the received sector data; and
   a buffer configured to store the compressed sector data,
   wherein the compression circuit is configured to overwrite the compressed sector data stored in the buffer in the first latch group among the plurality of latch groups corresponding to the input address.

2. The nonvolatile memory device of claim 1, wherein the address controller includes:
   a first address controller configured to output the output address under a first address control; and
   a second address controller configured to output the input address under a second address control.

3. The nonvolatile memory device of claim 2,
   wherein the address controller further includes a multiplexer configured to output either the output address or the input address, and
   wherein the first address control and the second address control are the same.

4. The nonvolatile memory device of claim 3,
   wherein the first address controller is configured to move, during an output operation, a first address pointer corresponding to the output address from a start point of the sector data to a last point of the sector data, and
   wherein the second address controller is configured to move, during an input operation, a second address pointer corresponding to the input address from a start point of the sector data to a point at which a predetermined amount is added to the start point of the sector data.

5. The nonvolatile memory device of claim 4, wherein the address controller is configured to retrieve a last point of the first address pointer and a last point of the second address pointer corresponding to a compressing operation for previous sector data during a compressing operation for subsequent sector data.

6. The nonvolatile memory device of claim 2,
   wherein the address controller further includes a multiplexer configured to output either the output address or the input address, and
   wherein the first address control and the second address control are different.

7. The nonvolatile memory device of claim 6,
   wherein the first address controller is configured to move, during an output operation, a first address pointer corresponding to the output address from a start point of the sector data to a last point of the sector data, and
   wherein the second address controller is configured to move, during an input operation, a second address pointer corresponding to the input address from a start point of the sector data to a point at which a predetermined amount is added to the start point of the sector data.

8. The nonvolatile memory device of claim 7,
   wherein the first address controller is configured to move the first address pointer to a start point corresponding to subsequent sector data during a compressing operation for the subsequent sector data, and
   wherein the second address controller is configured to move the second address pointer to a start point corresponding to the subsequent sector data during a compressing operation for the subsequent sector data.

9. The nonvolatile memory device of claim 1,
   wherein the sector data is divided into a plurality of data, and
   wherein the compression circuit includes a plurality of compression subcircuits configured to compress the plurality of data.

10. The nonvolatile memory device of claim 9, wherein the buffer includes a plurality of registers configured to store compressed data from the plurality of compression subcircuits, respectively.

11. A nonvolatile memory device, comprising:
    a plurality of latches;
    a plurality of compression circuits configured to compress data of a first size according to a predetermined compression ratio; and
    a plurality of registers configured to store the compressed data,
    wherein the plurality of latches are configured to output data as large as a first size to the plurality of compression circuits during an output operation while moving a first address pointer, and wherein the plurality of latches are configured to overwrite compression data of a second size corresponding to the predetermined compression ratio from the plurality of registers while moving a second address pointer during an input operation.

12. The nonvolatile memory device of claim 11,
wherein the first size is 128 bytes, and
wherein the second size is 32 bytes.

13. The nonvolatile memory device of claim 11, wherein a first address control corresponding to the output operation and a second address control corresponding to the input operation are the same.

14. The nonvolatile memory device of claim 11, wherein a first address control corresponding to the output operation and a second address control corresponding to the input operation are different.

15. The nonvolatile memory device of claim 11, wherein compressed data stored in the plurality of latches is output in response to a special command.

16. A method of operating a nonvolatile memory device, the method comprising:
outputting soft decision data from cache latches under a first address control;
compressing the soft decision data according to a predetermined compression ratio; and
overwriting the compressed soft decision data in a portion of the cache latches under a second address control,
wherein the first address control and the second address control are separated from each other.

17. The method of claim 16,
wherein the cache latches are divided into a plurality of sectors, and
wherein outputting the soft decision data includes outputting the soft decision data from corresponding latches while moving a first address pointer from a start point of a corresponding sector among the plurality of sectors to a last point of the sector under the first address control.

18. The method of claim 16, further comprising:
storing the compressed soft decision data in registers.

19. The method of claim 18, wherein overwriting a portion of the cache latches includes overwriting data in the registers of a portion of latches while moving a second address pointer by a predetermined amount from a start point of a sector under the second address control.

20. The method of claim 16, wherein the first address control and the second address control are the same or different.

* * * * *